US007313132B2

(12) United States Patent
Inoue et al.

(10) Patent No.: US 7,313,132 B2
(45) Date of Patent: *Dec. 25, 2007

(54) COMMUNICATION SCHEME WITH OPERATIONS TO SUPPLEMENT LIMITATIONS OF PORTABLE TERMINAL DEVICE

(75) Inventors: Atsushi Inoue, Tokyo (JP); Yasuro Shobatake, Tokyo (JP)

(73) Assignee: Kabushiki Kaisha Toshiba, Kawasaki-shi (JP)

( * ) Notice: Subject to any disclaimer, the term of this patent is extended or adjusted under 35 U.S.C. 154(b) by 917 days.

This patent is subject to a terminal disclaimer.

(21) Appl. No.: 10/681,200

(22) Filed: Oct. 9, 2003

(65) Prior Publication Data

US 2004/0077351 A1    Apr. 22, 2004

Related U.S. Application Data

(63) Continuation of application No. 09/408,270, filed on Sep. 29, 1999, now Pat. No. 6,643,284.

(30) Foreign Application Priority Data

Sep. 30, 1998   (JP)   ................................. 10-279087

(51) Int. Cl.
*H04L 12/66* (2006.01)
(52) U.S. Cl. ..................... 370/352; 370/338; 370/392
(58) Field of Classification Search ................ None
See application file for complete search history.

(56) References Cited

U.S. PATENT DOCUMENTS

| 5,910,946 | A | 6/1999 | Csapo |
| 6,075,783 | A | 6/2000 | Voit |
| 6,138,036 | A | 10/2000 | O'Cinneide |
| 6,141,341 | A | 10/2000 | Jones et al. |
| 6,141,356 | A | 10/2000 | Gorman |
| 6,295,302 | B1 | 9/2001 | Hellwig et al. |
| 6,370,394 | B1 | 4/2002 | Anttila |
| 6,597,687 | B1* | 7/2003 | Rao ........................... 370/352 |
| 6,721,306 | B1* | 4/2004 | Farris et al. ................ 370/352 |
| 7,218,952 | B1* | 5/2007 | Alperovich et al. ..... 455/552.1 |

FOREIGN PATENT DOCUMENTS

JP          9-270875 A          10/1997

* cited by examiner

*Primary Examiner*—Brian Nguyen
(74) *Attorney, Agent, or Firm*—Foley & Lardner LLP

(57) ABSTRACT

A communication scheme capable of realizing operations to supplement the resource shortage or the poor environment of the portable terminal device. At the radio portable terminal device, whether a specific processing of the data packets received from a correspondent device connected to the computer network or the telephone network is to be carried out using resources of the radio portable terminal device or not is determined according to an attribute of the data packets or data contained in the data packets, and a part or whole of the data contained in the data packets are transferred to another portable computer/device connected to a local network or another computer connected to the computer network, such that the specific processing of the data packets determined not to be carried out using the resources of the radio portable terminal device is carried out at another portable computer/device or another computer.

13 Claims, 16 Drawing Sheets

RADIO PORTABLE TERMINAL 1

RADIO PORTABLE TERMINAL 1

FIG.4

| # Hostname | Network | Address/Media |
|---|---|---|
| DESK1 | Internet | 133.196.16.201 |
| NOTE2 | Local | IrDA |

FIG.5

| # Hostname | Network | Address/Media | Preference |
|---|---|---|---|
| DESK1 | Internet | 133.196.16.201 | 2 |
| NOTE2 | Local | IrDA | 1 |

FIG.6

| # Hostname | Network | Address/Media | Preference | Status |
|---|---|---|---|---|
| DESK1 | Internet | 133.196.16.201 | 2 | alive |
| NOTE2 | Local | IrDA | 1 | N/A |

FIG.7

APPL=IP-tel, Datasize>100KB, Forward : Attachment
APPL=ftp, Datasize>100KB, Forward : File
APPL=Internet-advertisement, Forward : NO
APPL=Internet-news-clip, Forward : NO
APPL=IP-tel-send, areacode=408, Forward : to DESK1

COMMUNICATION SCHEME WITH OPERATIONS TO SUPPLEMENT LIMITATIONS OF PORTABLE TERMINAL DEVICE

The present application is a Continuation of U.S. application Ser. No. 09/408,270, filed Sep. 29, 1999, the entire contents of which are incorporated herein by reference.

BACKGROUND OF THE INVENTION

1. Field of the Invention

The present invention relates to a communication scheme for carrying out voice (speech) or data communications through a radio telephone network, and more particularly to a communication scheme in which a connection to the Internet is made via a radio telephone network and voice or data communications are carried out in the IP packet format through this connection.

2. Description of the Background Art

Due to the spread of portable telephone (cellular telephone) or PHS (Personal Handyphone System) terminals, communication services utilizing the radio communication system are now widely in use. In these portable telephone (cellular telephone) or PHS terminals, communication services are realized by carrying out radio communications with radio base stations and being multiply connected to wired communication networks through these base stations.

On the other hand, due to the spread of the worldwide computer network called the Internet, various information services on the Internet have been developed. In particular, much attentions have been attracted to the Internet telephone (IP telephone) for carrying out communications through the Internet by assembling IP packets from telephone voice data, which takes the advantage of the fact that communication cost is quite low on the Internet compared with the conventional telephone network. Typically, as shown in FIG. 19, IP telephone gateways for relaying between a voice telephone network and the Internet are provided inside telephone stations, for example, and communications between these gateways are realized through the Internet such that communications can be carried out with only a fee up to the closest telephone station (or the closest IP telephone gateway location) even in the case of long distance telecommunications.

Such an Internet telephone is also applicable to the case where the terminal is a radio portable terminal such as a cellular telephone or PHS terminal. For example, as shown in FIG. 20, the Internet radio telecommunication system can be realized by providing a router device for managing a plurality of radio base stations such that this router device functions as the IP telephone gateway and carries out data exchange with the Internet.

Of course, on the Internet, multimedia data in various formats can be transferred according to the standard protocol. For example, voice, still images, dynamic images, data files of specific application, etc. can be transferred by the single TCP/IP protocol by assembling IP packets from these data. Consequently, in FIG. 20, by setting up a protocol for transferring TCP/IP packets between the router device and the radio portable terminal through the radio base station, it becomes possible to exchange these multimedia data transferred on the Internet while utilizing the Internet telephone at the same time. More specifically, it becomes possible to realize an application which enables voice communications while transferring related image data (data of references or maps, for example), or receiving a news clip in voice while also receiving related photographs as images.

However, in the case of carrying out the multimedia communications including the Internet telephone as described above by using a radio portable terminal, the radio portable terminal which generally has a compact size is expected to be associated with various limitations regarding resources.

For instance, there can be cases where even when the image data are received, there is no display device that can display the received image data in sufficient resolution. There is also a limitation that the screen size is small.

Also, because the multimedia data generally have large data sizes, it is even possible to encounter situations where the entire transmitted multimedia data cannot be stored in the worst case.

On the other hand, in view of the environment in which the Internet and the telephone network are utilized, in many cases the utilization environment of the radio portable terminal is generally worse compared with the ordinary fixed PC, for example. For instance, there can be cases where a contract for the local telephone can be made at a fixed rate only for the fixed PC at one's home but not for the radio portable terminal, or cases where many Internet applications are more convenient to use on the ordinary PC than the radio portable terminal (such as cases where many more Web address information can be maintained on the ordinary PC than the radio portable terminal for obvious reasons).

As described, in the case of realizing an Internet service that handles the Internet telephone and the multimedia data by using a radio portable terminal, the radio portable terminal which generally has a compact size is associated with many limitations regarding resources, such as a lack of a display device capable of displaying image data in sufficient resolution, or a lack of ability for mounting a storage device such as memory or disk that can store the large amount of multimedia data, for example.

Also, the radio portable terminal is associated with a poorer handling of applications or a poorer environment that requires a higher communication medium utilization fee, for example, compared with the fixed PC at a home or even the portable note PC.

SUMMARY OF THE INVENTION

It is therefore an object of the present invention to provide a communication scheme capable of realizing operations to supplement the resource shortage or the poor environment of the portable terminal device.

According to one aspect of the present invention there is provided a radio portable terminal device, comprising: a radio communication unit for carrying out communications via a computer network or a telephone network through a radio base station by exchanging data packets; a local network communication unit for carrying out communications with another portable computer/device connected to a local network different from the computer network or the telephone network, the local network being a network locally defined for communications between the radio portable terminal device and said another portable computer/device; and a packet transfer processing unit for determining whether a specific processing of the data packets received from a correspondent device connected to the computer network or the telephone network by the radio communication unit is to be carried out using resources of the radio portable terminal device or not, according to an attribute of the data packets or data contained in the data packets, and transferring a part or whole of the data contained in the data packets to at least one of said another portable computer/device from the local network communication unit and another computer connected to the computer network from the radio communication unit, such that the specific processing of the data packets determined not to be carried out using the resources of the radio portable terminal device is carried out at said at least one of said another portable computer/device and said another computer.

According to another aspect of the present invention there is provided a radio portable terminal device, comprising: a radio communication unit for carrying out communications with a correspondent device connected to a computer network or a telephone network, through a radio base station by exchanging data packets; and a packet transfer processing unit for determining whether a prescribed condition is satisfied for the communications with the correspondent device or not, and transferring data packets containing data to be transmitted to the correspondent device to a prescribed another computer connected to the computer network such that the data to be transmitted to the correspondent device are transmitted to the correspondent device from the prescribed another computer when it is determined that the prescribed condition is satisfied for the communications with the correspondence device.

According to another aspect of the present invention there is provided a gateway device, comprising: a transfer unit for transferring voice data received from a network for transferring data packets, to a radio portable terminal device that is a destination of the voice data, via a telephone network through a radio base station or via the network through a router device and a radio base station; and a control unit for judging whether a specified condition is satisfied by non-voice data that are to be transferred along with the voice data to the radio portable terminal device, if the non-voice data exist, and controlling the transfer unit to transfer the non-voice data to another computer/device without transferring the non-voice data to the radio portable terminal device when it is judged that the specified condition is satisfied by the non-voice data.

According to another aspect of the present invention there is provided a communication processing control method at a radio portable terminal device, comprising the steps of: connecting the radio portable terminal device with a correspondent device connected to a computer network or a telephone network, through a radio base station, and receiving data packets from the correspondent device; connecting the radio portable terminal device with another portable computer/device connected to a local network different from the computer network or the telephone network, the local network being a network locally defined for communications between the radio portable terminal device and said another portable computer/device; determining at the radio portable terminal whether a specific processing of the data packets received from the correspondent device is to be carried out using resources of the radio portable terminal device or not, according to an attribute of the data packets or data contained in the data packets; and transferring a part or whole of the data contained in the data packets from the radio portable terminal device to said another portable computer/device or another computer connected to the computer network, such that the specific processing of the data packets is carried out at said another portable computer/device or said another computer when the determining step determines that the specific processing of the data packets is not to be carried out using the resources of the radio portable terminal device.

According to another aspect of the present invention there is provided a communication processing control method at a radio portable terminal device, comprising the steps of: connecting the radio portable terminal device with a correspondent device connected to a computer network or a telephone network, through a radio base station, and receiving data packets from the correspondent device; determining at the radio portable terminal device whether a prescribed condition is satisfied for communications with the correspondent device or not; and transferring data packets containing data to be transmitted to the correspondent device from the radio portable terminal device to a prescribed another computer connected to the computer network such that the data to be transmitted to the correspondent device are transmitted to the correspondent device from the prescribed another computer when the determining step determines that the prescribed condition is satisfied for the communications with the correspondence device.

According to another aspect of the present invention there is provided a communication processing control method at a gateway device, comprising the steps of: transferring voice data received at the gateway device from a network for transferring data packets, to a radio portable terminal device that is a destination of the voice data, via a telephone network through a radio base station or via the network through a router device and a radio base station; judging at the gateway device whether a specified condition is satisfied by non-voice data that are to be transferred along with the voice data to the radio portable terminal device, if the non-voice data exist; and controlling the gateway device to transfer the non-voice data to another computer/device without transferring the non-voice data to the radio portable terminal device when the judging step judges that the specified condition is satisfied by the non-voice data.

Other features and advantages of the present invention will become apparent from the following description taken in conjunction with the accompanying drawings.

BRIEF DESCRIPTION OF THE DRAWINGS

FIG. 4 is a diagram showing one exemplary configuration of a related PC information table in the radio portable terminal device of FIG. 3.

FIG. 5 is a diagram showing another exemplary configuration of a related PC information table in the radio portable terminal device of FIG. 3.

FIG. 6 is a diagram showing still another exemplary configuration of a related PC information table in the radio portable terminal device of FIG. 3.

FIG. 7 is a diagram showing an exemplary configuration of a transfer data attribute table in the radio portable terminal device of FIG. 3.

DETAILED DESCRIPTION OF THE PREFERRED EMBODIMENTS

Figure 1:
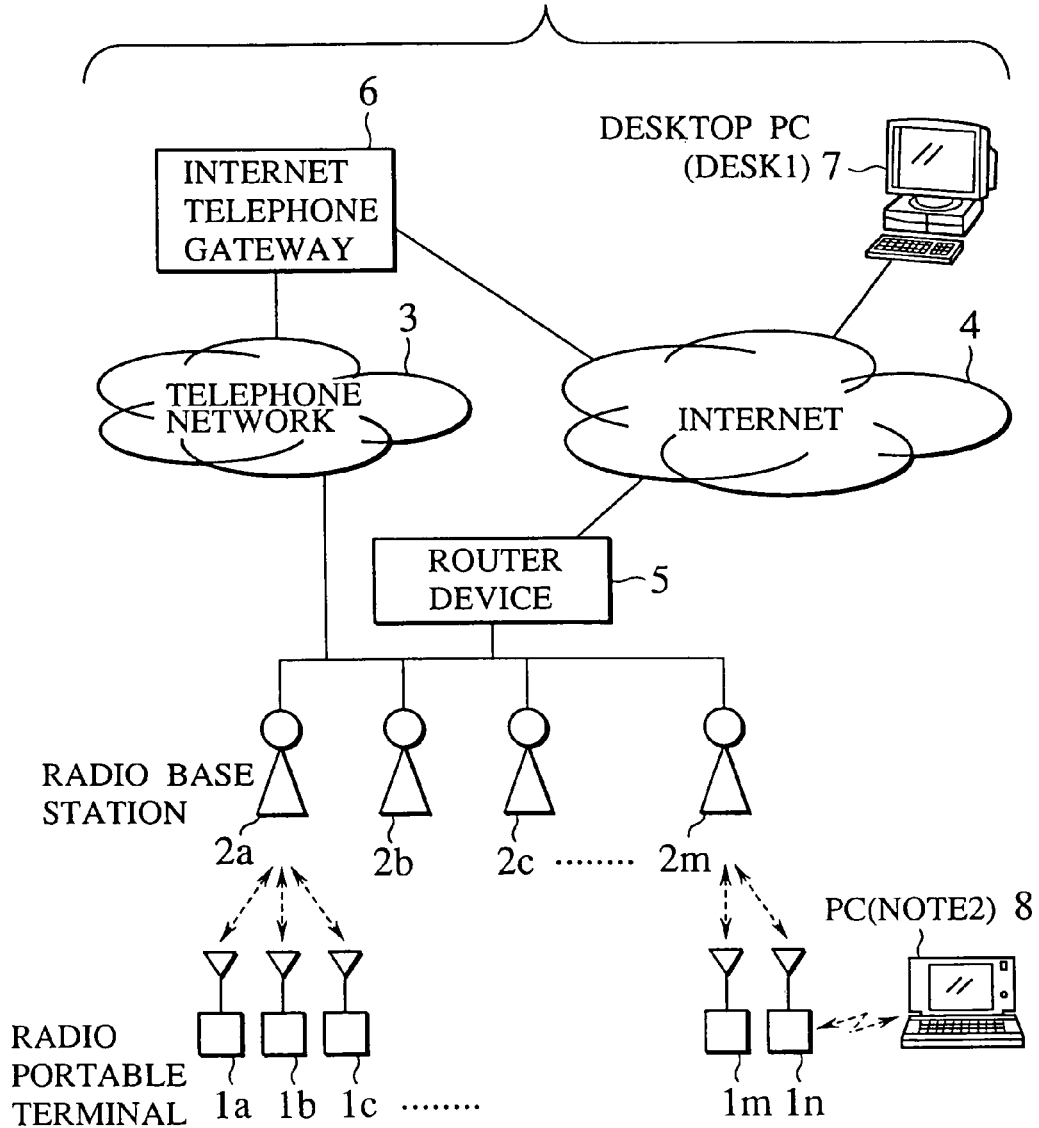
FIG. 1 is a schematic diagram showing an exemplary basic configuration of a network for realizing the communication scheme according to one embodiment of the present invention.

First, the major features of a communication scheme according to the present invention will be briefly summarized.

In the present invention, a radio portable terminal device having a function for transmitting or receiving data packets through a radio base station with respect to a correspondent device that is connected to a computer network or a telephone network determines whether or not to carry out packet communications by cooperating with another computer according to properties of the packet communications.

For example, while communications using the radio portable terminal device are carried out, when the image data or the like that is received as attached information of the voice data are to be displayed, if a display device associated with the radio portable terminal device has a problem regarding a resolution or a screen size, the image data are transferred to another computer having a higher performance display device, such that the image data can be displayed there immediately, or stored there and displayed later on.

Also, for example, when the radio portable terminal device received an ftp file and this file is to be stored, if a memory associated with the radio portable terminal has a problem regarding a capacity, this file is transferred to another computer having a memory with a larger capacity, such that this file can be stored there instead.

Also, for example, in the case of accessing some Web page from the radio portable terminal device, if a direct access from the radio portable terminal device is more costly than accessing from another computer and transferring the access result from there to the radio portable terminal device, the acquisition and transfer of that Web page are requested from the radio portable terminal device to that another computer, such that the Web page information can be acquired at a lower cost.

There are also many other possible forms of cooperation between the radio portable terminal device and another computer.

Note that the determination as to whether or not to cooperate with another computer can be made, for example, by registering in advance a cooperating condition and a corresponding cooperation processing, and determining to cooperate when the communication satisfies the condition. Also, when it is determined to cooperate, the cooperation processing specified in correspondence to the satisfied condition will be executed.

It is also possible to provide a plurality of computers as candidates for the another computer to be cooperated, and the another computer to be cooperated can be selected from them according to the properties of the packet communications.

For example, in the above described case of displaying the image data, the note PC that is carried around by the user along with the radio portable terminal device can be selected such that the image data can be transferred and displayed there immediately. Also, in the above described case of storing the ftp file, the desktop PC at the user's home can be selected such that the ftp file can be transferred there through the Internet and stored there, and then read there after the user comes back to the home. Also, in the above described case of accessing the Web page, a computer for which the cost becomes lowest can be selected.

Also, according to the present invention, it becomes possible for the radio portable terminal device to make a connection to the Internet via a radio telephone network and exchange voice data and other multimedia data by using TCP/IP packet communications, while carrying out temporal storing, transfer, and other processing of the transmitted or received data in cooperation with another computer that is connected with the radio portable terminal device via the Internet connection or local communications using radio, infrared, etc.

Thus, according to the present invention, as the radio portable terminal device cooperates with another computer, it becomes possible to take full advantages of the advantageous features of the radio portable terminal such as its mobility, convenience in use, and practical usefulness, while realizing operations to supplement its limitations regarding its performance as a computer, operation environment or communication cost.

Referring now to FIG. 1 to FIG. 18, the embodiment of a communication scheme according to the present invention will be described in detail.

First, with reference to FIG. 18, the basic configuration of this embodiment will be described.

Figure 18:
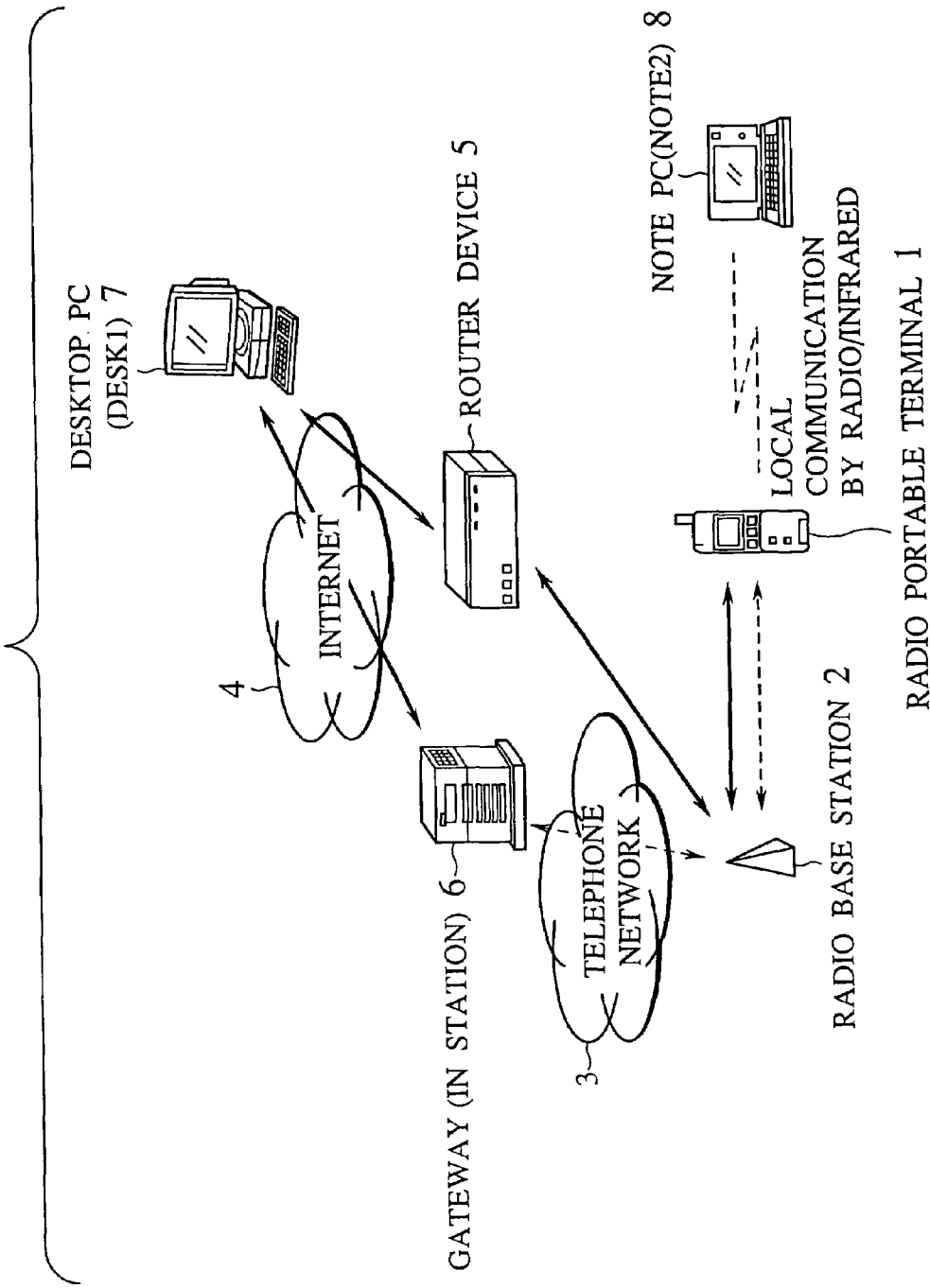
FIG. 18 is a diagram for explaining a cooperative operation of a radio portable terminal device and another computer according to one embodiment of the present invention.
Figure 19:
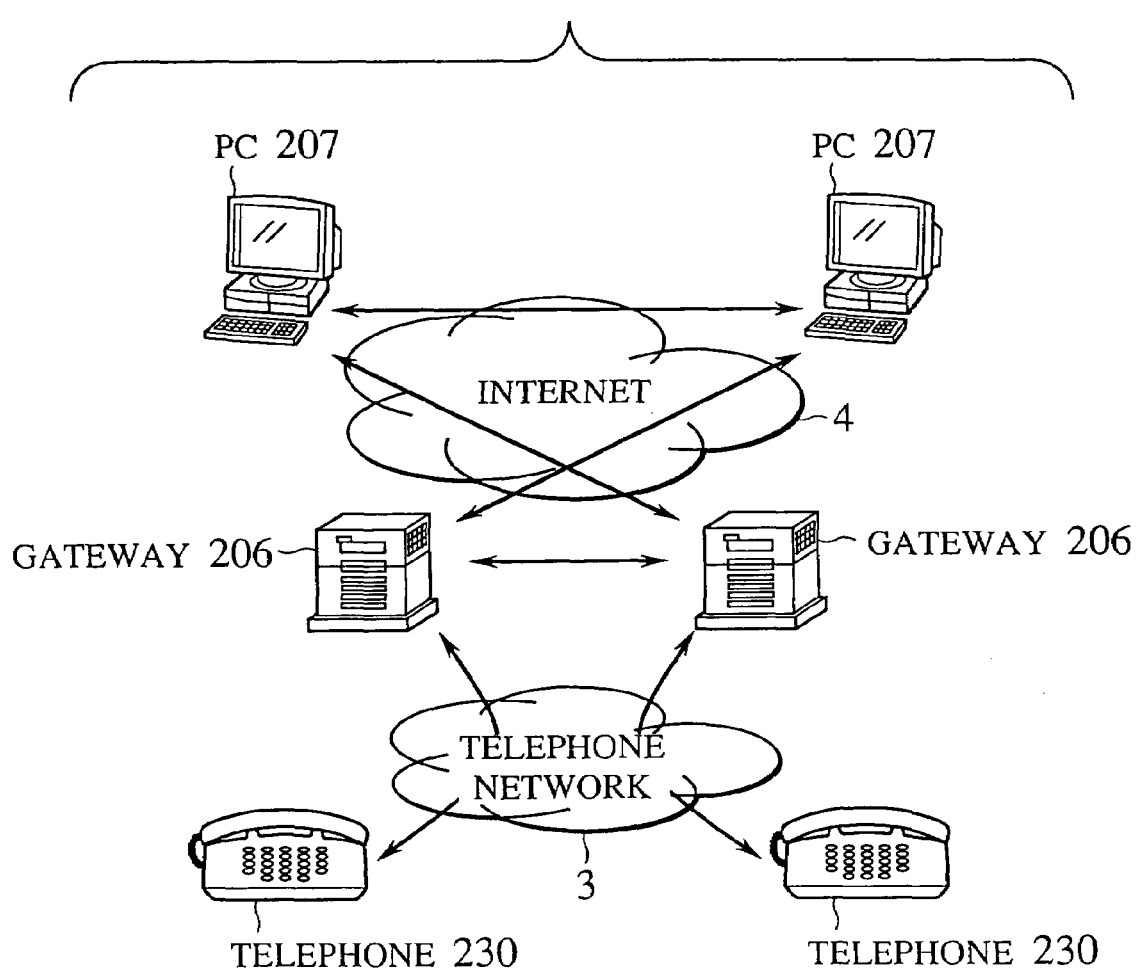
FIG. 19 is a diagram for explaining a conventional Internet telephone network.
Figure 20:
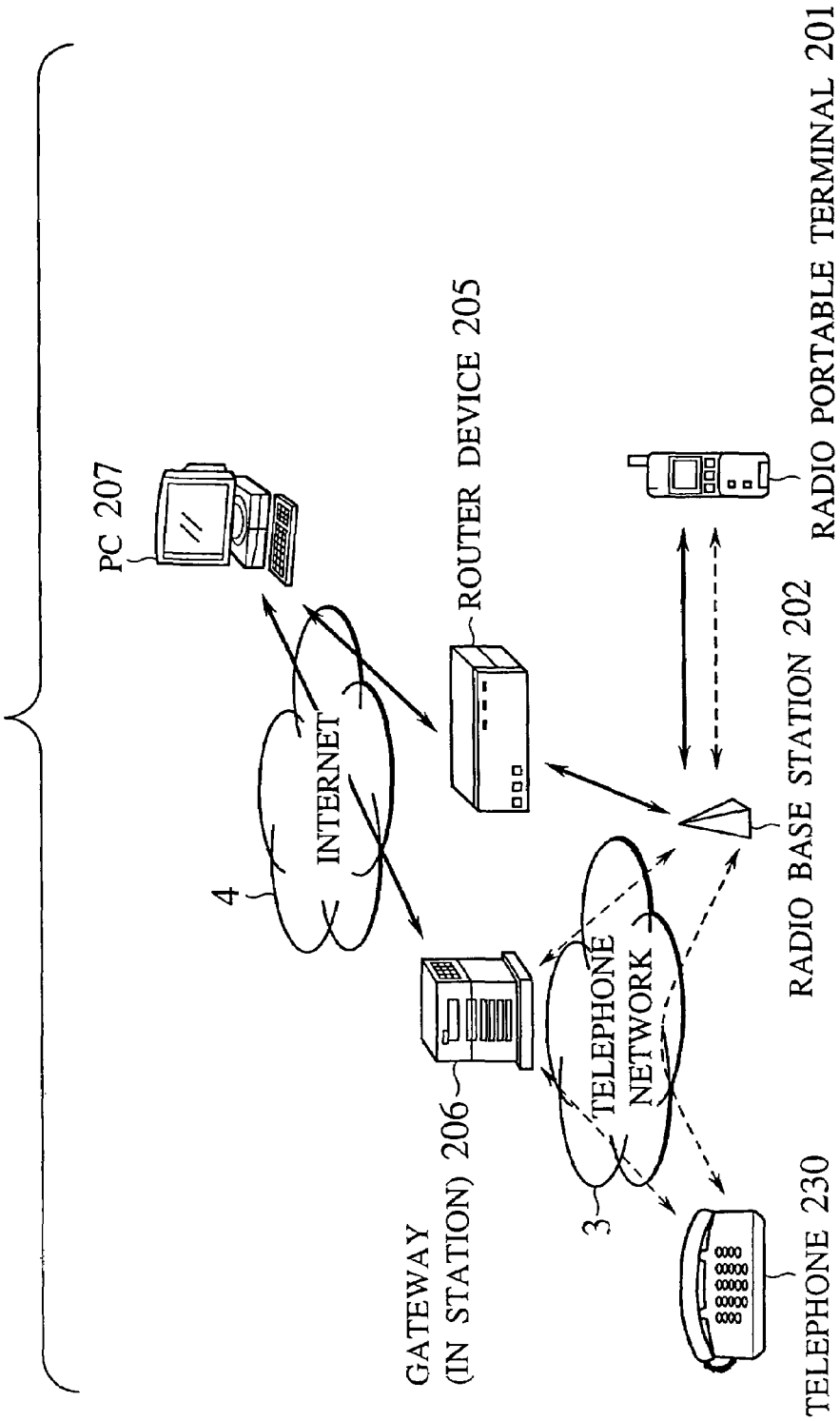
FIG. 20 is a diagram for explaining a conventional Internet radio telephone network.

FIG. 18 shows an exemplary network configuration considered in this embodiment, and a manner of utilization of a radio portable terminal according to this embodiment. In FIG. 18, the case where the radio portable terminal 1 carries out some communications with a correspondent not shown in the figure will be considered.

The radio portable terminal 1 has a function for carrying out communications and other processing by itself, but in this embodiment, the radio portable terminal 1 also has a function for carrying out communications and other processing in cooperation with a fixed computer 7 that is located at a home or an office (which is assumed to be a desktop PC at a home in this embodiment) and/or a mobile computer 8 which is also carried around by a user of this radio portable terminal 1 (which is assumed to be a note PC in this embodiment). The radio portable terminal 1 is capable of communicating with the desktop PC 7 via an IP network, for example, and communicating with the node PC 8 by local communications using a medium such as radio LAN, Bluetooth, or infrared (IrDA), for example (but IP communications may be also possible).

This radio portable terminal 1 has a function for carrying out Internet communications via a radio telephone network, and at a time of exchanging voice data or other multimedia data by communications using TCP/IP packets, the radio portable terminal 1 registers a cooperating computer in advance and carries out a control for switching the processing content regarding display, storing, transfer (communication), etc., according to data attribute (data amount, processing capability, storing capability, etc., for example) of received data or data to be transmitted. For example, this control can be made as follows:

(1) voice data or image data are immediately outputted from a voice output device or a display associated with the own device (and not stored);

(2) Received data are stored into a local storage device provided inside the own device, in a file format;

(3) Received data or data to be transmitted to the correspondent are transferred to the registered computer and separately stored or processed there; and (4) voice data are outputted from a voice output device associated with the own device, while image data are transferred to the registered computer and stored there.

In this way, it becomes possible to take full advantages of the advantageous features of the radio portable terminal such as its mobility, convenience in use, and practical usefulness, while realizing operations to supplement its limitations regarding its performance as a computer, operation environment or communication cost.

Now, a communication scheme according to this embodiment of the present invention will be described in further detail.

FIG. 1 shows an exemplary basic configuration of a network according to this embodiment. The radio network is operated by a radio communication service provider in general, and radio portable terminals 1*a* to 1*n* of FIG. 1 are accommodated using radio base stations 2*a* to 2*m* of FIG. 1 such that services of communications between the portable radio terminals 1, as well as communications between a radio portable terminal 1 and a telephone accommodated in a telephone network 3 are provided. Also, a router device 5 is provided such that services of transfers of packets containing voice data or other multimedia data transmitted from a radio portable terminal 1 to the IP network 4 (Internet, for example) or packet transfers from the IP network (Internet, for example) to the radio portable terminal 1 are provided by this router 5.

On the other hand, the telephone network 3 is operated by a radio communication service provider in general, and telephones (not shown) are accommodated such that services of communications between telephones and communications between the telephone and the radio portable terminal 1 are provided. Also, an internet telephone gateway 6 is provided such that the Internet telephone service provided by transferring voice telephone data via the IP network by this internet telephone gateway 6.

The internet telephone gateway 6 is a device for converting voice telephone data into IP packets and transferring IP packets to the Internet at a time of using the Internet telephone, which is assumed to be provided inside a telephone station in this example. In the case of using the Internet telephone, the user makes a dial-up connection to an access number allocated to this Internet telephone gateway 6, and gives necessary destination data to the Internet telephone gateway 6. The Internet telephone gateway 6 then searches the IP address of the Internet telephone gateway 6 nearby the correspondent, and makes a connection on the IP network. The Internet telephone gateway 6 nearby the correspondent calls up a telephone of the correspondent and establishes an end-to-end connection. In FIG. 1, any of communications between telephones within the telephone network 3, communications between radio portable terminals 1, and communications between a telephone and a radio portable terminal 1 become possible by utilizing this service.

In such a connection set up utilizing the Internet telephone gateway 6, it is assumed that the radio portable terminals 1*a* to 1*n* operate as ordinary radio telephones and call up the nearby Internet telephone gateways 6. In this case, there is a connection via the telephone network 3 between the radio portable terminal and the Internet telephone gateway, and a processing for converting analog speed data into digital signals, assembling IP packets from the digital signals and transferring the IP packets to the IP network is carried out on the Internet telephone gateway 6.

Figure 2:
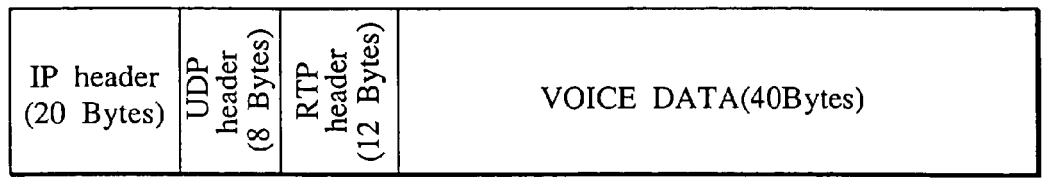
FIG. 2 is a diagram showing an exemplary IP voice data packet format used in the communication scheme according to one embodiment of the present invention.

As a format of an IP packet to be assembled from the voice telephone data, a combination of RTP (Real Time Protocol) and UDP (User Datagram Protocol) can be used, for example. FIG. 2 shows an exemplary packet format in this case.

Note that, in this embodiment, it is supposed that the radio portable terminal 1 can also access the IP network via the router device 5 provided on an upstream side of the radio base station 2, rather than via the internet telephone gateway 6. Consequently, if the sufficient computation resource can be reserved on the radio portable terminal 1 side, the digital voice packets may be transmitted via the router device 5 by carrying out the above processing of the Internet telephone gateway 6 on the radio portable terminal 1 side. Note however that this function is available only in the case where a mechanism for searching an IP address of the correspondent gateway and a coding scheme of the telephone voice data are disclosed by the service provider.

Namely, in this embodiment, in the case of transmitting IP voice data to the radio portable terminal 1, either one of the following two options can be selected arbitrarily:

(1) A call is terminated via the telephone network 3 through the Internet telephone gateway 6 nearby the radio portable terminal 1; and (2) IP packets are directly transferred to the radio portable terminal 1 via the router device 5, without using the Internet telephone gateway 6 nearby the radio portable terminal 1, and the voice data are taken out from the IP packets, converted into analog signals and outputted at the radio portable terminal 1.

Similarly, an option of using the nearby Internet telephone gateway 6 and an option of transmitting IP packets directly can be selected in the case where the radio portable terminal 1 is the transmitting side.

Now, as described above, there are other PCs to be operated in cooperation with the radio portable terminals 1*a* to 1*n* in this system, such as the desktop PC 7 and the note PC 8 in FIG. 1. The desktop PC 7 is a PC provided at a home of a user of the radio portable terminal, which is also connected to the Internet 4. On the other hand, the node PC 8 is a PC to be carried around by the user along with the radio portable terminal 1, and the radio portable terminal 1 is assumed to be capable of communicating with the note PC 8 via the Internet 4 or via a local network using radio or infrared (such as IrDA). Note that the operation in the case of communications via the Internet 4 with the note PC 8 is basically the same as in the case of the desktop PC 7, so that only the case of communications via a local network using radio or infrared (such as IrDA) will be described as far as the note PC 8 is concerned.

Next, the configuration of the radio portable terminal according to this embodiment will be described.

Figure 3:
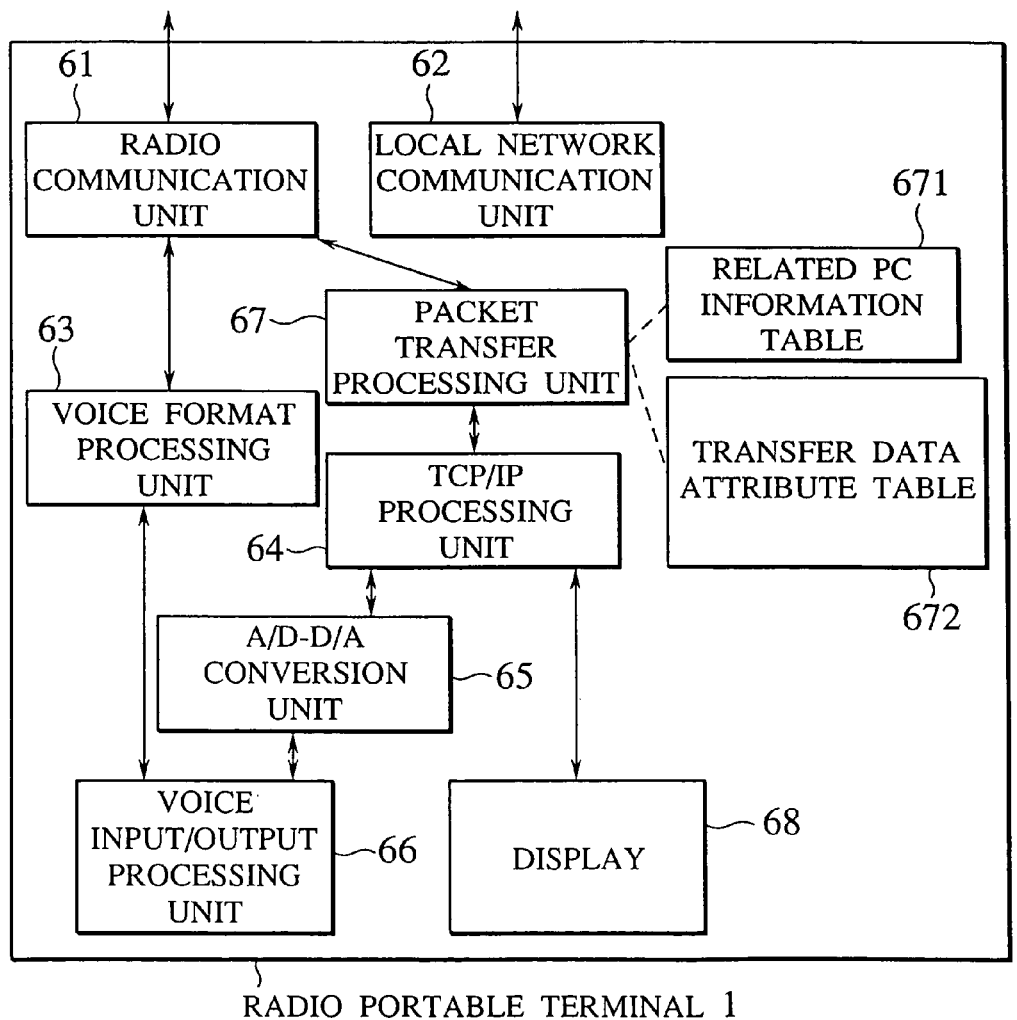
FIG. 3 is a block diagram showing an exemplary internal configuration of a radio portable terminal device according to one embodiment of the present invention.

FIG. 3 shows an exemplary internal configuration of the radio portable terminal in this embodiment.

This radio portable terminal 1 of FIG. 3 comprises a radio communication unit 61, a local network communication unit 62, a voice format processing unit 63, a TCP/IP processing unit 64, A/D-D/A conversion unit 65, a voice input/output processing unit 66, a packet transfer processing unit 67, a display 68, as well as other input/output devices and memory devices (not shown). In addition, this radio portable terminal 1 is equipped with functions of an ordinary telephone or computer according to the need.

The radio communication unit 61 is an input/output unit for communicating with the radio telephone network through any one of the radio base stations 2a to 2m (that is selected according to the receiving signal intensity, for example) similarly as an ordinary radio telephone. On the other hand, the local network communication unit 62 is an interface for communicating with the note PC 8 that is carried around by the user along with this radio portable terminal 1, using radio or infrared (such as IrDA). These communication modules control the IP data transfer processing using the related PC control information described below.

The voice format processing unit 63 carries out processing of the voice telephone data. The voice telephone data received from the radio telephone network are processed here and sent to the voice input/output processing unit 66.

On the other hand, the voice packet data that are directly received from the IP network 4 are received at the TCP/IP processing unit 64, converted into analog data at the A/D-D/A conversion unit 65, and sent to the voice input/output processing unit 66. Also, when data other than the voice data, such as image data, are received from the IP network 4, these data are processed by appropriate dedicated application at the TCP/IP processing unit 64 and outputted at the display 68 according to the need.

The display 68 is a unit associated with the radio portable terminal 1 which is assumed to have considerably poorer output size, resolution, etc., compared with the other desktop PC or node PC.

The packet transfer processing unit 67 transfers transmission/reception data of a specific attribute to the registered desktop PC 7 or node PC 8 according to the related PC control information that is specified in advance.

FIG. 4 shows an exemplary configuration of a related PC information table 671 that stores information on the related PCs. This table registers a logical name of PC that is to be the transfer destination, a communication route (Internet/Local-net) and an IP address (in the case of the Internet).

In this example, two PCs including the desktop PC 7 (host name: DESK1, network: via Internet, address: IP address=133.196.16.201) that is provided at a home of the user of the radio portable terminal and the note PC 8 (host name NOTE2, network: local connection, media: IrDA) that is carried around along with the radio portable terminal are registered as the related PCs.

Note that a Preference field may be added in the related PC information table of FIG. 4 such that the packets are transferred according to the priority levels assigned to a plurality of registered related PCs. FIG. 5 shows an exemplary format of the related PC information table in which NOTE2 is given a higher priority over DESK1.

Also, in the case where the radio portable terminal is operated under the unstable operation environment, it is possible to adopt such an operation policy that an inspection message is transmitted to each related PC regularly, whether it is possible to communicate with each PC or not is monitored, and packets are not transferred to such a related PC with which the communication is temporarily impossible. FIG. 6 shows an exemplary format of the related PC information table in which the communication capability information (Status) of each PC is further incorporated into the format of FIG. 5. In the example of FIG. 6, packets are transferred at a higher priority to NOTE2 if both PCs are capable of communicating, but when NOTE2 is not capable of communicating because of the battery power outage or because IrDA is unavailable as NOTE2 is put inside a bag, for example, this fact is automatically detected and packets are transferred to DESK1 instead.

In this case, the communication capability detection module can be easily realized by using ping program as an upper level application of TCP/IP, for example, and it suffices to register the detected communication capability status into the related PC information table 671.

Note that, in the above, the priority level is assigned to each PC in advance, but it is also possible to select PC by comprehensively accounting for various characteristics of each PC and/or data attributes in addition.

Also, in the case where a plurality of PCs are registered, a selection of a plurality of PCs may be allowed, or a selection of a plurality of PCs may be even positively encouraged depending on conditions. In the case of selecting a plurality of PCs, the identical data may be broadcasted or multicasted, for example, or data may be distributed among the selected PCs.

Next, FIG. 7 shows an exemplary configuration of a transfer data attribute table 672 for specifying what data should be transferred to the above described registered related PCs (the desktop PC 7 and the note PC 8 in this example).

The data attributes can be controlled from various viewpoints, and FIG. 7 shows an exemplary case of specifying whether or not to transfer data depending on the attributes, according to the following rules:

(Rule 1) For a voice communication session using an attached file of 100 KB or more, the attached data are transferred to the related PC.

(Rule 2) The ftp data of 100 KB or more are transferred to the related PC.

(Rule 3) Data of specific applications (Internet-advertisement and Internet-news-clip in this example) are forcefully outputted at the own device.

(Rule 4) Telephone data that can be communicated by a local telephone from a PC provided at a home (the desktop PC7 in this example) are transferred to that PC and a call is originated from there.

As for those data for which there is no matching rule or for which no specification is given in the corresponding rule, it is assumed that the default processing content according to these data will be executed. For example, for a voice communication session using an attached file of less than 100 KB, the voice is outputted at the radio portable terminal while the attached data are also displayed/stored at the radio portable terminal. Also, for a voice communication session using an attached file of 100 KB or more, the voice is outputted at the radio portable terminal.

Various other rules may be used here instead, and can be appropriately set in view of the situation of the radio portable terminal such as its resources, performance, environment, etc., or the user's purpose of utilization, etc. Also, the user may be allowed to select a part or all of these rules. These remarks also apply to the default processing content as well.

In the following, how the transfer processing is to be carried out for each specified data attribute will be described for various concrete examples.

First, some examples of the control which results in not transferring data to the related PC (and a special processing is carried out inside the radio portable terminal 1) will be described. These examples are directed to the case of rule 3 described above.

Figure 8:
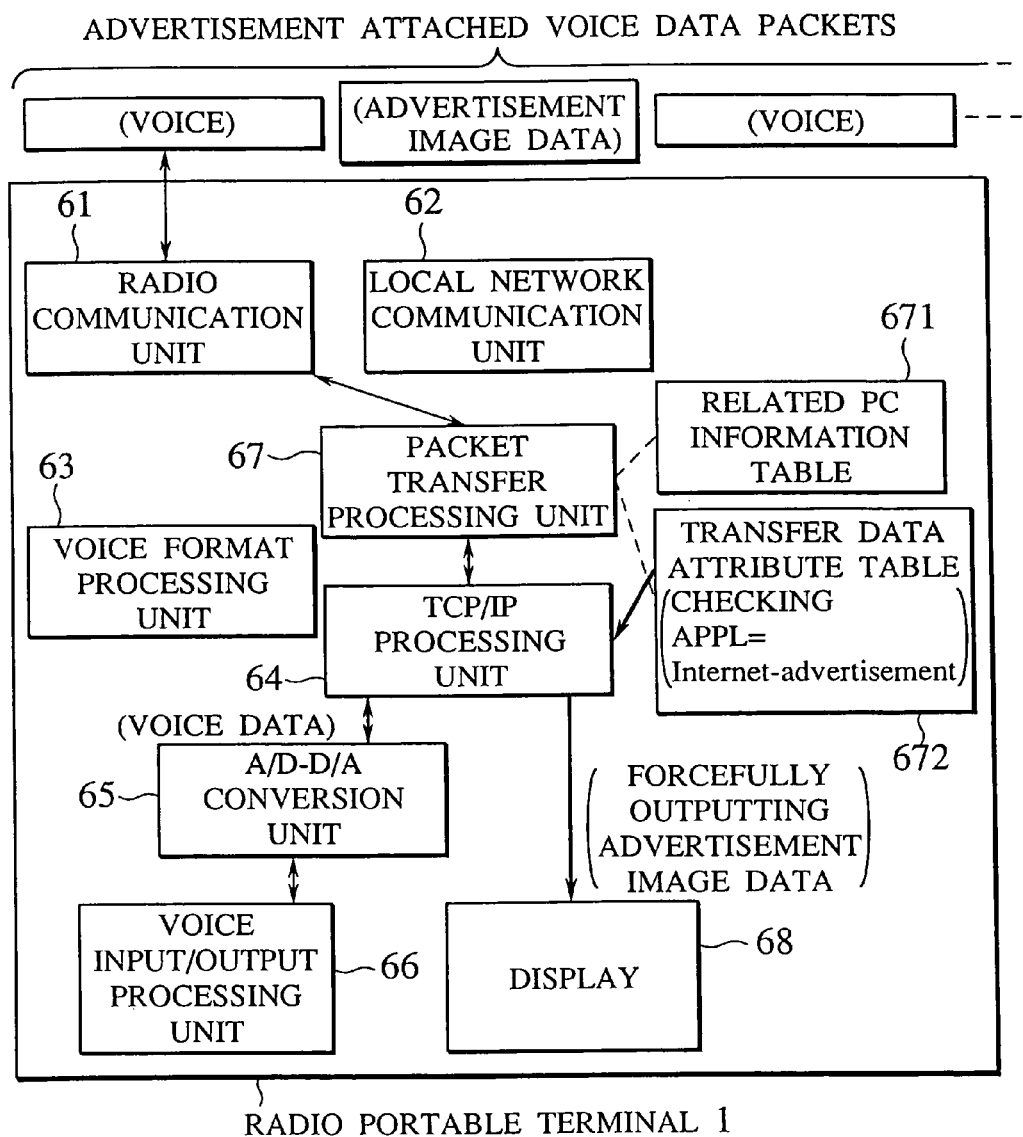
FIG. 8 is a diagram for explaining an exemplary operation sequence with respect to attached data packets in the radio portable terminal device of FIG. 3.

FIG. 8 shows an exemplary case where certain kinds of image/character data are neither stored inside the radio portable terminal 1 nor transferred to the related PC but simply displayed at the radio portable terminal 1.

In the concrete example of the third rule shown in FIG. 7, data packets specified by APPL=Internet-advertisement are advertisement message data (image/character data) that are transmitted by being attached to the voice packets of the Internet telephone. This rule realizes the control such that the advertisement message data are forcefully outputted in real time directly from the display while data themselves are discarded, for the sake of those users who consider the buffering of the advertisement message data at the radio portable terminal 1 as nothing but the waste of memory.

In FIG. 8, the data packets on which the voice data are mounted are sequentially processed at the radio communication unit 61, the packet transfer processing unit 67, the TCP/IP processing unit 64, the A/D-D/A conversion unit 65, and the voice input/output processing unit 66, and then the voice output is made.

On the other hand, the image data that are the attached data are sent through the radio communication unit 61, the packet transfer processing unit 67, and the TCP/IP processing unit 64. At the TCP/IP processing unit 64, the upper level protocol identifier is checked and all the attached advertisement message data are displayed at the display 68 if the data match with the APPL=Internet-advertisement rule, for example.

Note that, in this case, the processing for converting the voice data packets into analog signals may be carried out at either the radio portable terminal 1 side or the Internet telephone gateway 6 side, but FIG. 8 shows the case where it is carried out at the radio portable terminal 1 side.

Figure 9:
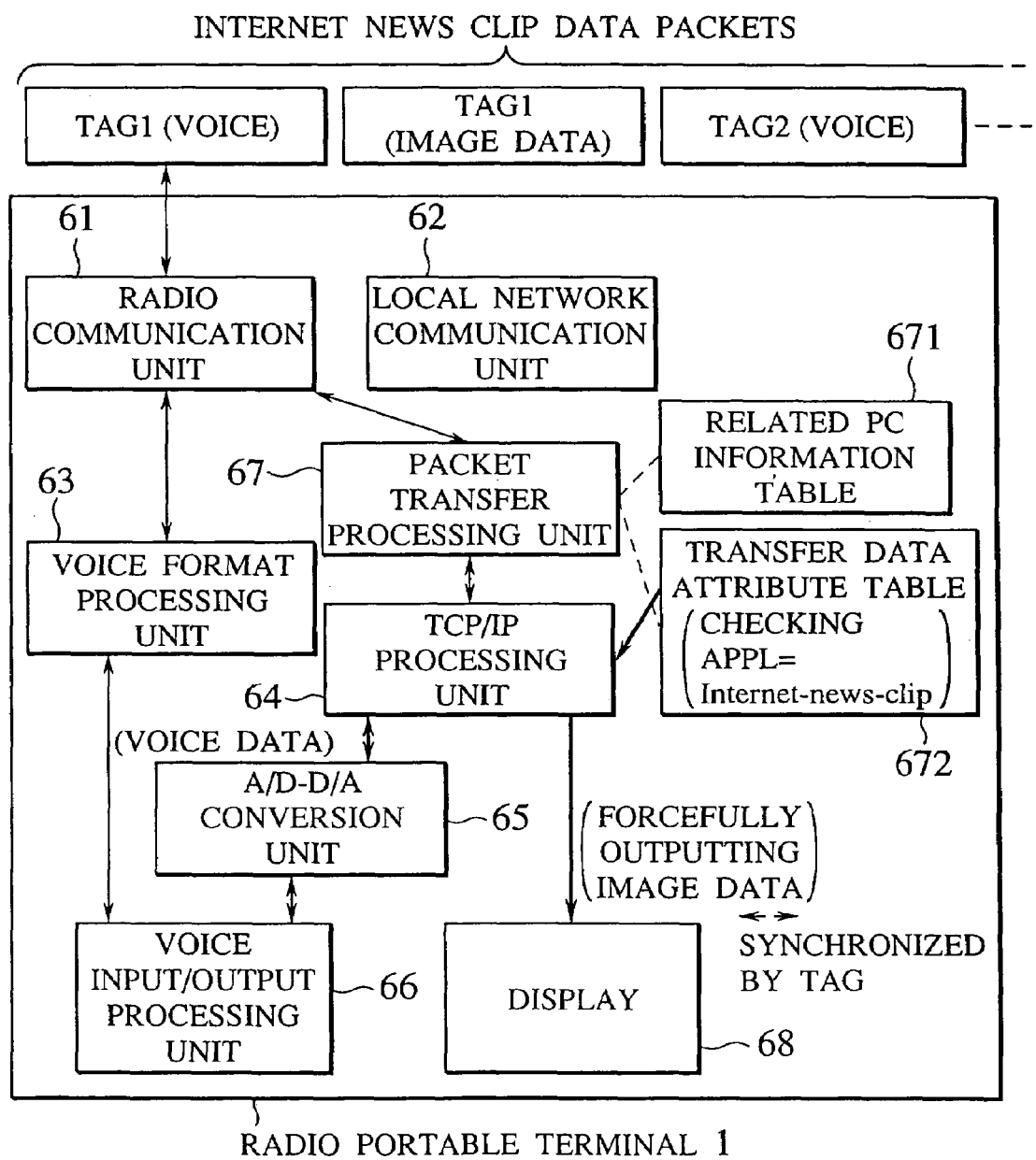
FIG. 9 is a diagram for explaining an exemplary operation sequence with respect to synchronized data packets in the radio portable terminal device of FIG. 3.

Next, FIG. 9 shows an exemplary case where the voice and the image/character data are outputted in synchronization.

In the concrete example of the fourth rule shown in FIG. 7, data packets specified by APPL=Internet-news-clip are the news clip data that are transferred using the Internet telephone as the medium.

This service outputs the image/character data transferred by being attached to the voice packets in synchronization with the voice so that it becomes possible to display picture images or reference materials related to the news script can be displayed, for example. More specifically, a synchronization tag data for the voice packets and the attached data are attached within the data format of the news clip, and the voice and the image are outputted in synchronization according to these synchronization tag data.

Note that, in this case, the processing for converting the voice data packets into analog signals may be carried out at either the radio portable terminal 1 side or the Internet telephone gateway 6 side, but FIG. 9 shows the case where it is carried out at the radio portable terminal 1 side.

In FIG. 9, the data packets on which the voice data are mounted are sequentially processed at the radio communication unit 61, the packet transfer processing unit 67, the TCP/IP processing unit 64, the A/D-D/A conversion unit 65, and the voice input/output processing unit 66, and then the voice output is made. On the other hand, the image data that are the attached data are sequentially processed at the radio communication unit 61, the packet transfer processing unit 67, and the TCP/IP processing unit 64, and then displayed at the display 68.

Here, in general, the attached image data have much larger size than the voice data so that a transfer delay will occur. For this reason, if data match with the APPL=Internet-news-clip rule as a result of checking the upper level protocol identifier at the TCP/IP processing unit 64, the voice output is temporarily suspended, and the arrived voice data packets are buffered after the conversion (at the A/D-D/A conversion unit 65, for example) until all the necessary image data to be displayed in synchronization arrive at the radio portable terminal 1 and displayed for a prescribed period of time.

Figure 10:
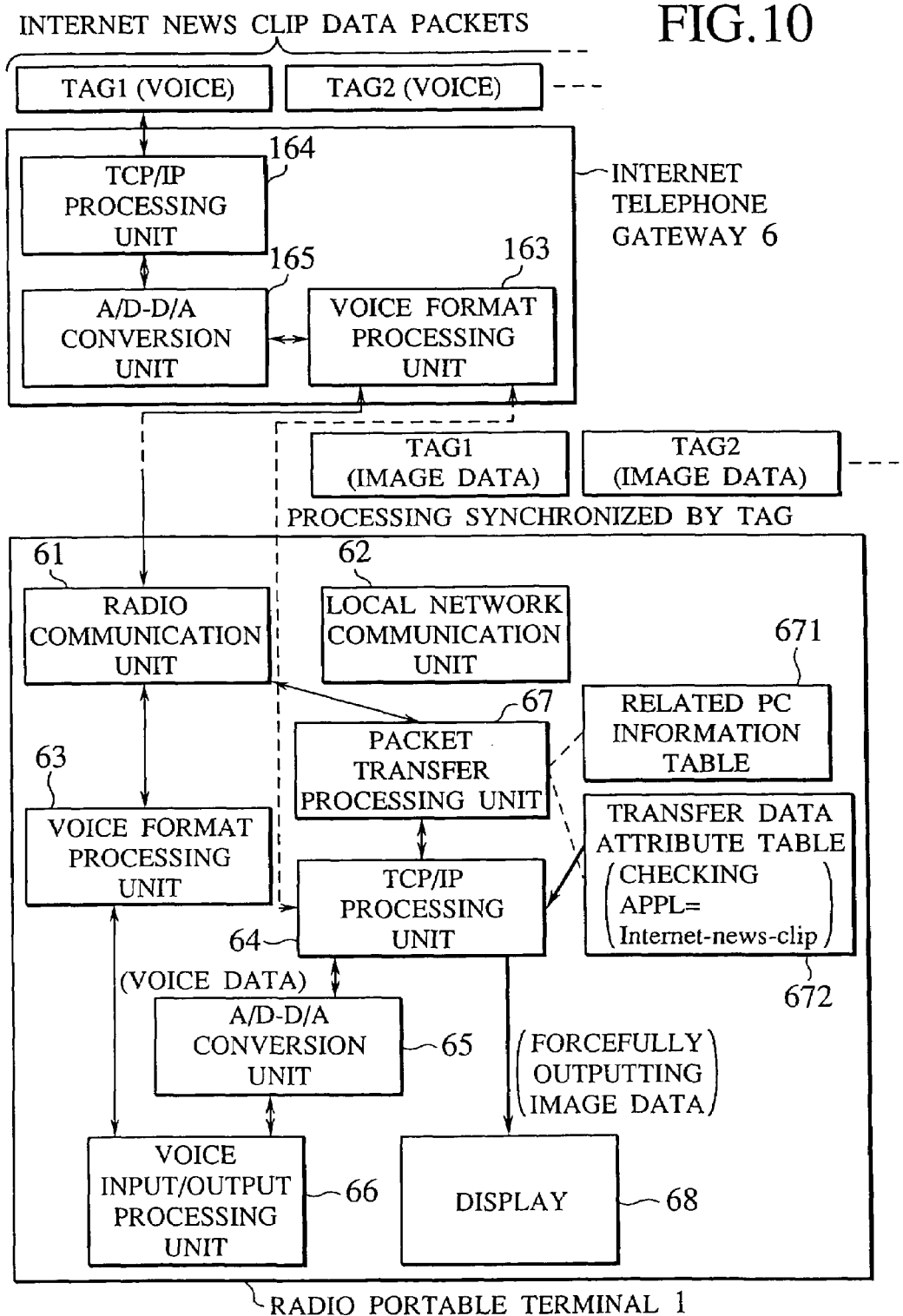
FIG. 10 is a diagram for explaining another exemplary operation sequence with respect to synchronized data packets in the radio portable terminal device of FIG. 3.

In FIG. 9, the case of carrying out the processing for converting the voice data packets into analog signals at the radio portable terminal 1 side is shown, but in the case where the processing for converting the voice data packets into analog signals is to be carried out at the Internet telephone gateway 6 side as shown in FIG. 10, the voice will be processed at (the TCP/IP processing unit 164, the A/D-D/A conversion unit 165 and the voice format processing unit 163 of) the Internet telephone gateway 6, while the synchronized data will be processed at (the TCP/IP processing unit 64 of) the radio portable terminal 1.

In this case, the buffering of the voice data packets can be carried out at the Internet telephone gateway 6, and the voice output can be made upon receiving a message from the radio portable terminal 1 notifying that the processing of the synchronized data having a prescribed synchronization tag data has been completed.

Next, some examples of the control for transferring a part or a whole of the received data to the related PC will be described, These examples are directed to the case of rules 1 and 2 described above.

Figure 11:
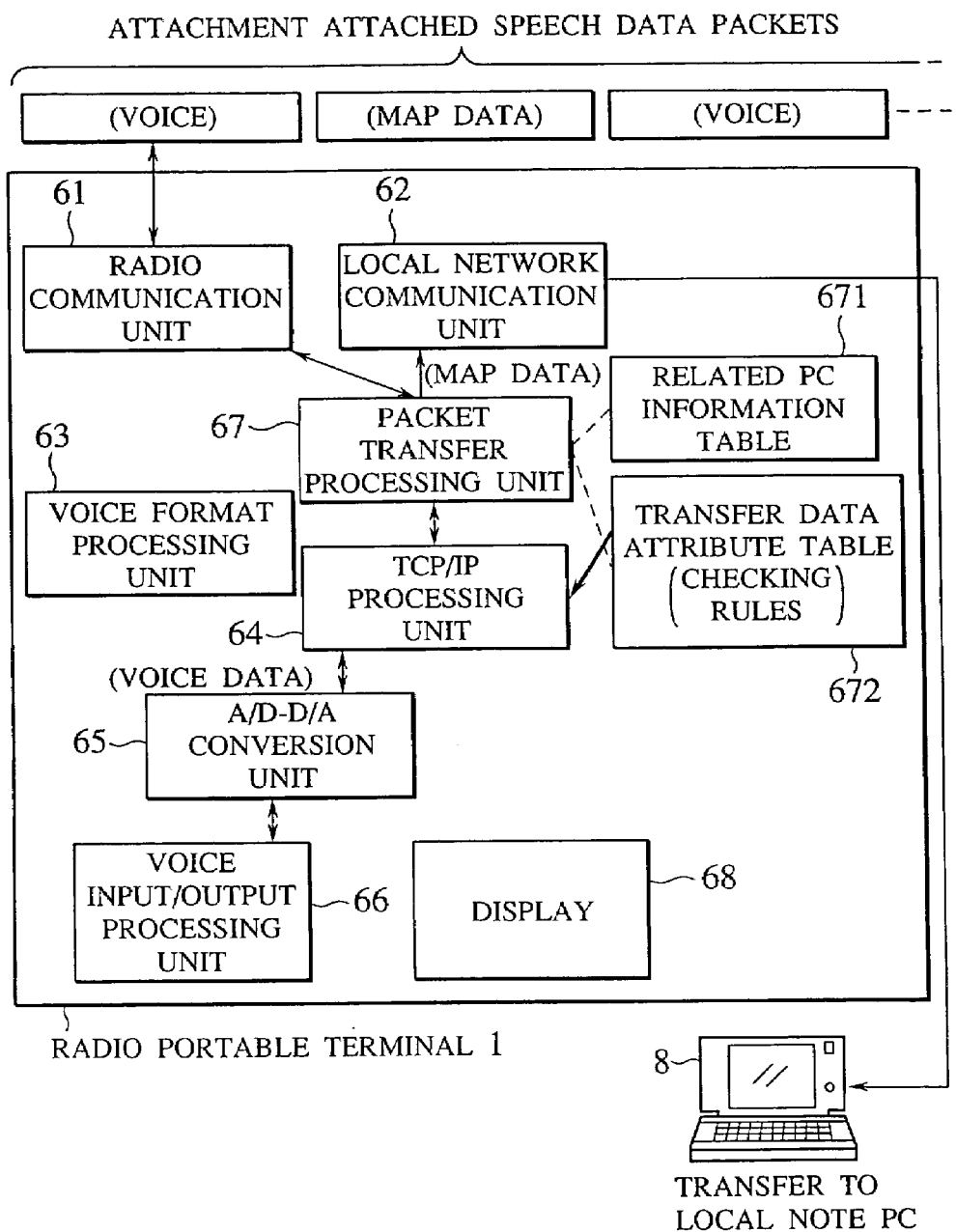
FIG. 11 is a diagram for explaining another exemplary operation sequence with respect to synchronized data packets in the radio portable terminal device of FIG. 3.

FIG. 11 shows an exemplary case of transferring data that satisfy some condition to the related PC while neither displaying nor storing the data at the radio portable terminal 1.

These two rules, that is, (Rule 1) For a voice communication session using an attached file of 100 KB or more, the attached data are transferred to the related PC; and (Rule 2) The ftp data of 100 KB or more are transferred to the related PC;

are the control regarding an amount of data to be transferred.

In general, the memory capacity on the radio portable terminal 1 side is limited so that this control transfers the attached data portion to the related PC, for a session (Internet voice communication, e-mail, ftp itself) containing the attached data that exceed a certain amount.

For example, as shown in FIG. 11, in the case where the image data of a map is attached to the voice communication, the voice is outputted at the radio portable terminal 1, but the image data are neither displayed nor stored at the radio portable terminal 1 side and transferred via the local network to the note PC 8, for example, because the sufficient resolution for enabling the comprehension of the map cannot be obtained at the display 68 of the radio portable terminal 1.

Note that the transferred image data may be subsequently displayed at that PC or after further transferring them to another computer. For example, in the case where the image data are transferred to the note PC 8, the image data can be displayed at the note PC 8 during the communication.

Figure 12:
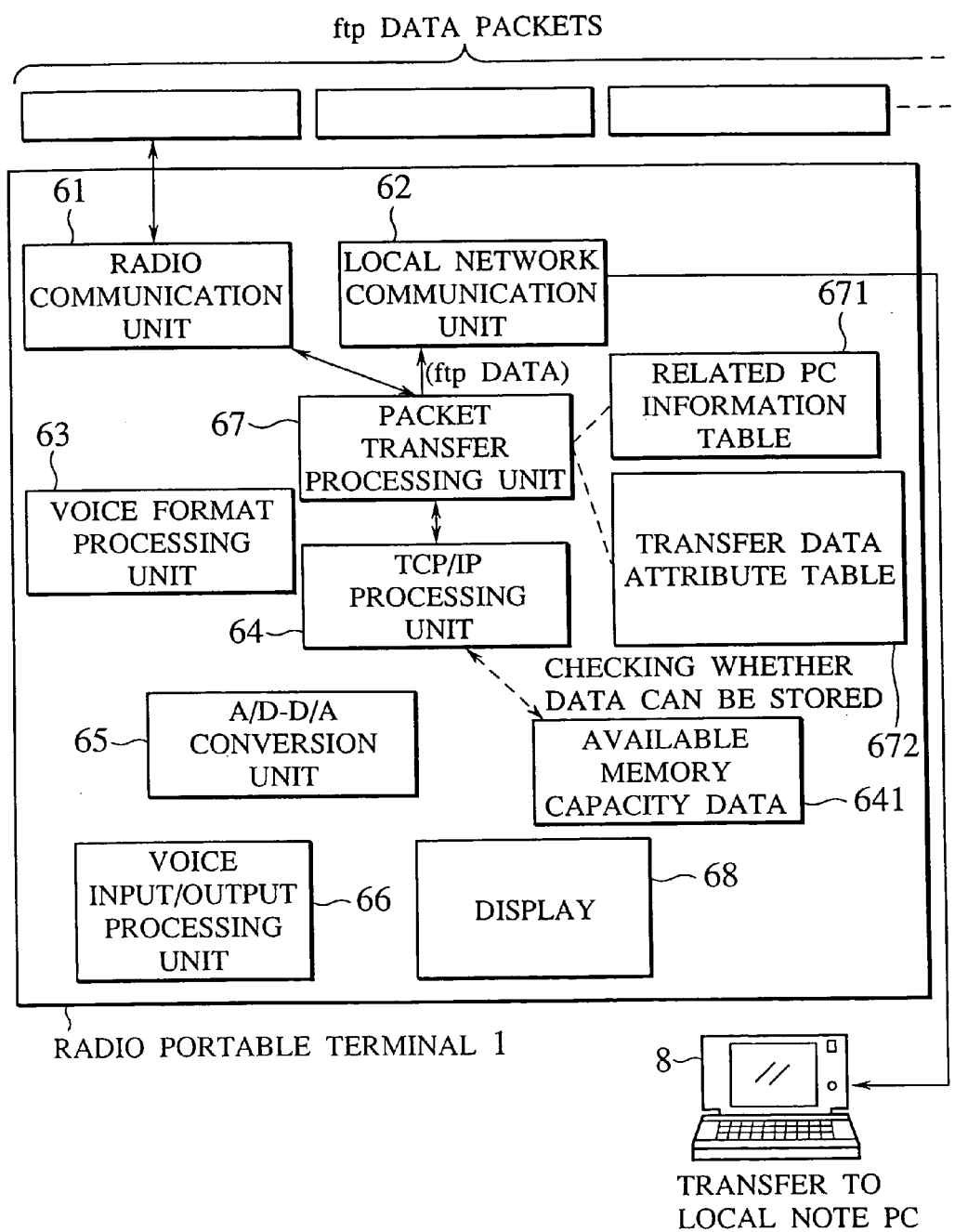
FIG. 12 is a diagram for explaining another exemplary operation sequence with respect to synchronized data packets in the radio portable terminal device of FIG. 3.

Instead of the case shown in FIG. 11 in which whether or not to transfer the received data to another computer is determined using the predetermined data size as a reference, it is also possible to determine whether or not to transfer the received data in view of the memory capacity that is currently actually available at the radio portable terminal 1 as shown in FIG. 12.

For example, it is possible to carry out the control such that an available memory capacity data 641 with a value x can be maintained, and if the data size of the received ftp data packets is less than or equal to x, or less than or equal to kx where k is a prescribed coefficient satisfying 0<k<1, then the received ftp data packets are stored in a memory of the own device, whereas otherwise the received ftp data packet is transferred via the local network to the note PC 8, for example.

Figure 13:
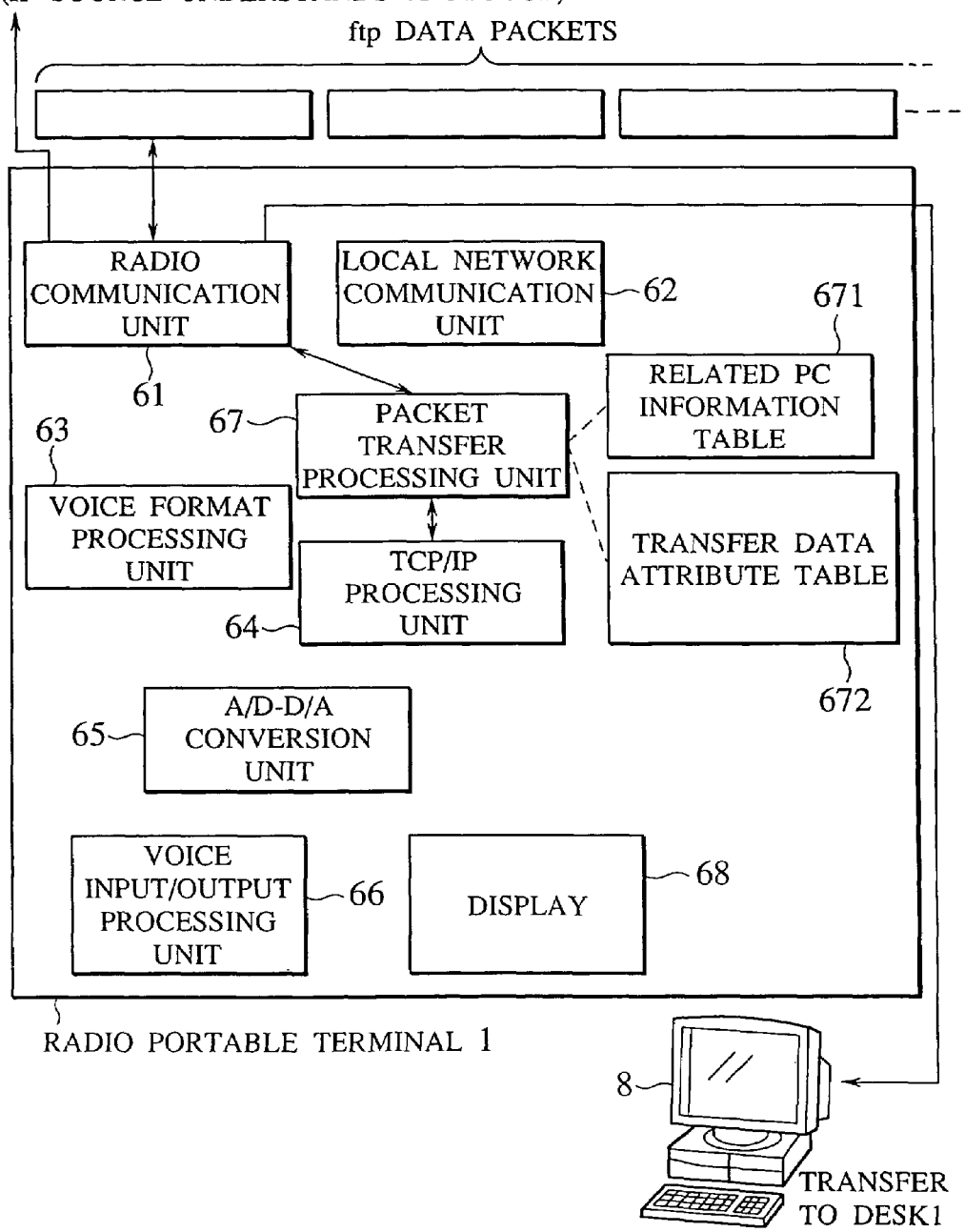
FIG. 13 is a diagram for explaining another exemplary operation sequence with respect to synchronized data packets in the radio portable terminal device of FIG. 3.

Moreover, instead of the cases shown in FIG. 10 and FIG. 11 in which the data once received by the own device are to be transferred to the note PC 8, it is also possible to transfer the data via the Internet to the desktop PC 7, as shown in FIG. 13.

In addition, in this case, instead of following the procedure in which the radio portable terminal 1 transfers the once received data to the desktop PC 7, it is possible to notify the transfer destination data to the source at a timing of the start of the session that is specified in the transfer data attribute table 672, such that the data buffering at the radio portable terminal 1 side can be eliminated and the system can be used as if the data transfer to the desktop PC 7 is carried out as the background Job on the Internet.

Figure 14:
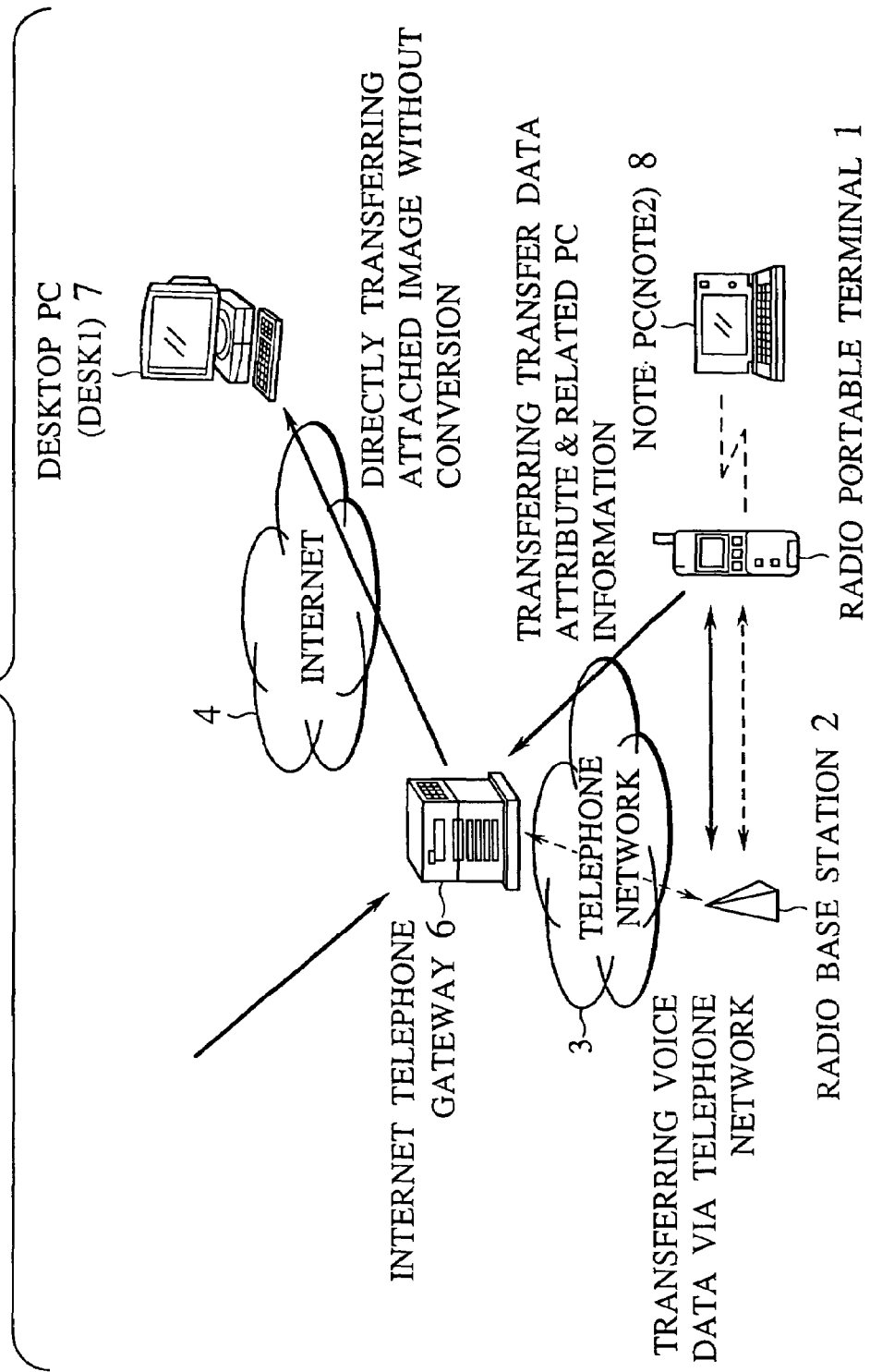
FIG. 14 is a diagram for explaining an exemplary operation sequence with respect to attached data packets in an Internet telephone gateway according to one embodiment of the present invention.

Now, in the case of the communication form in which the voice data and the attached data are transferred to the Internet telephone gateway 6 and the voice data are converted into analog signals there, it is also possible to control such that copies of the related PC information table 671 and the transfer data attribute table 672 are given to the Internet telephone gateway 6 and the Internet telephone gateway 6 transfers packets to the desktop PC 7 immediately when the matching data sequence is received, as shown in FIG. 14.

Figure 15:
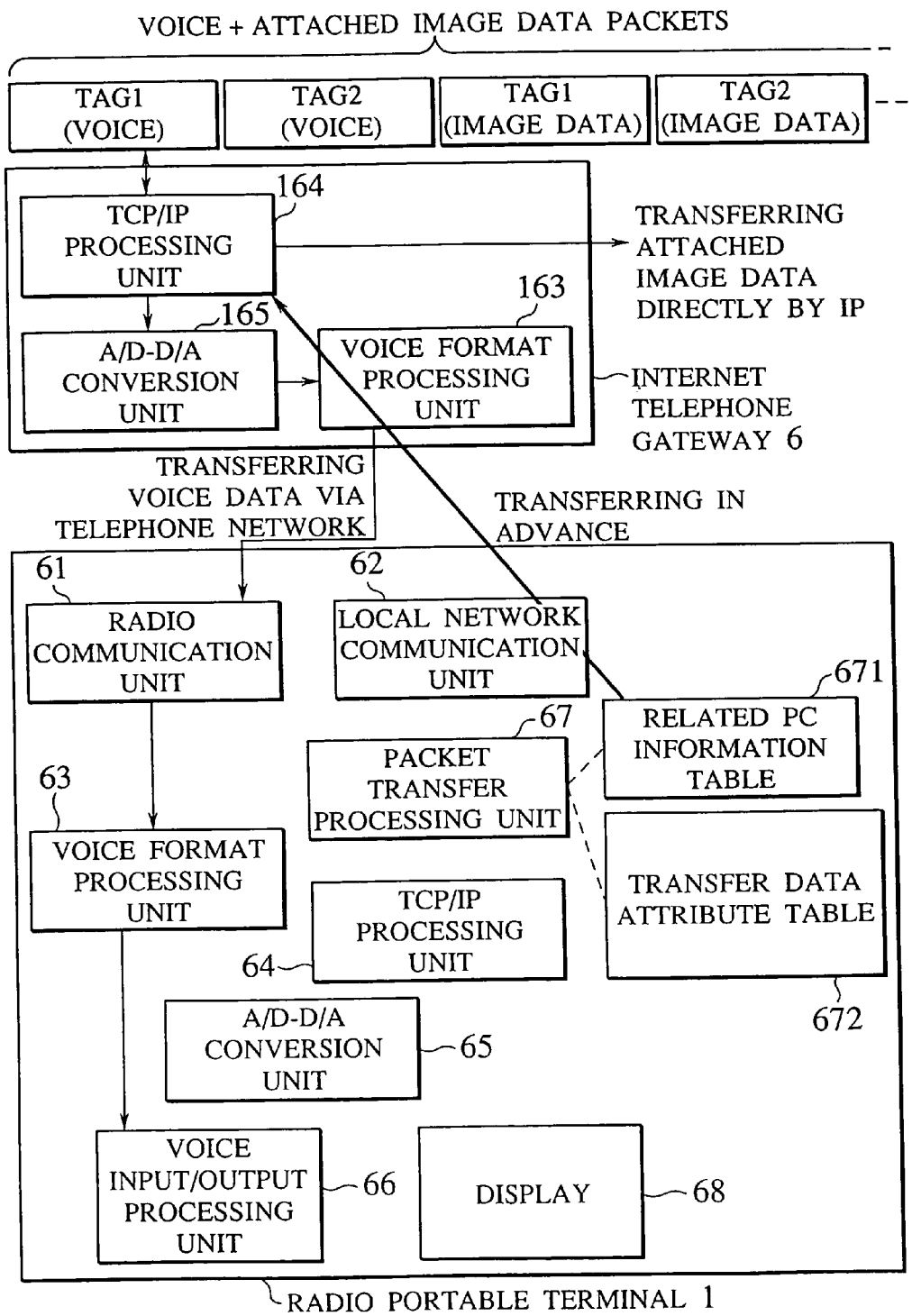
FIG. 15 is a diagram for explaining another exemplary operation sequence with respect to attached data packets in an Internet telephone gateway according to one embodiment of the present invention.

In this case, as shown in FIG. 15, both the related PC information table 671 and the transfer data attribute table 672 are registered at the Internet telephone gateway 6 in the telephone station in advance, and the Internet telephone gateway 6 is controlled to transfer the received data to the desktop PC 7 in forms of IP packets without applying the D/A conversion whenever the received data match the attribute table.

This control can be applied, for example, to the case where all the news clip data (that are delivered via the Internet telephone) are transferred to the desktop PC 7 and stored there in the IP format, while the user is moving.

Next, some examples of the control accounting for cost related aspects will be described.

Figure 16:
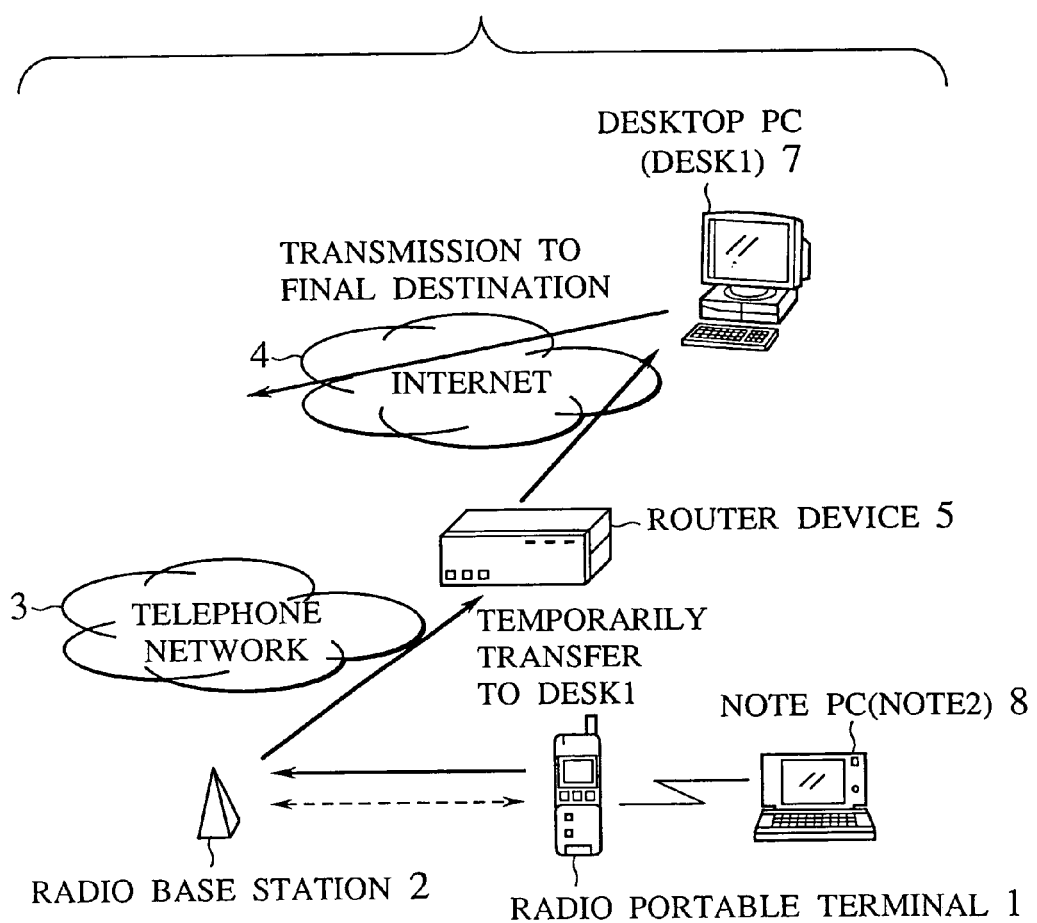
FIG. 16 is a diagram for explaining an exemplary operation sequence with respect to transmission data packets in the radio portable terminal device of FIG. 3.

As shown in FIG. 16, for the batch processing like transmission processing, there are cases where an operation of transferring data via the Internet to the desktop PC 7 once and then re-transmitting data from there to the final destination is advantageous in view of the cost than an operation of transmitting data directly from the radio portable terminal 1, for the reason such as that the transfer destination is closer to the desktop PC 7 on network, that the connection fee becomes higher when the radio portable terminal 1 is used, etc., for example.

The transfer rule for this case can be given as follows, for example:

IF Sent-packet-size>=50 MB, forward to DESK1, then send to dest.

In this rule, the transfer of any data with a size of 50 MB or more is carried out not from the radio portable terminal 1 but by transmitting data to the desktop PC 7 once and then re-transmitting data from there.

Figure 17:
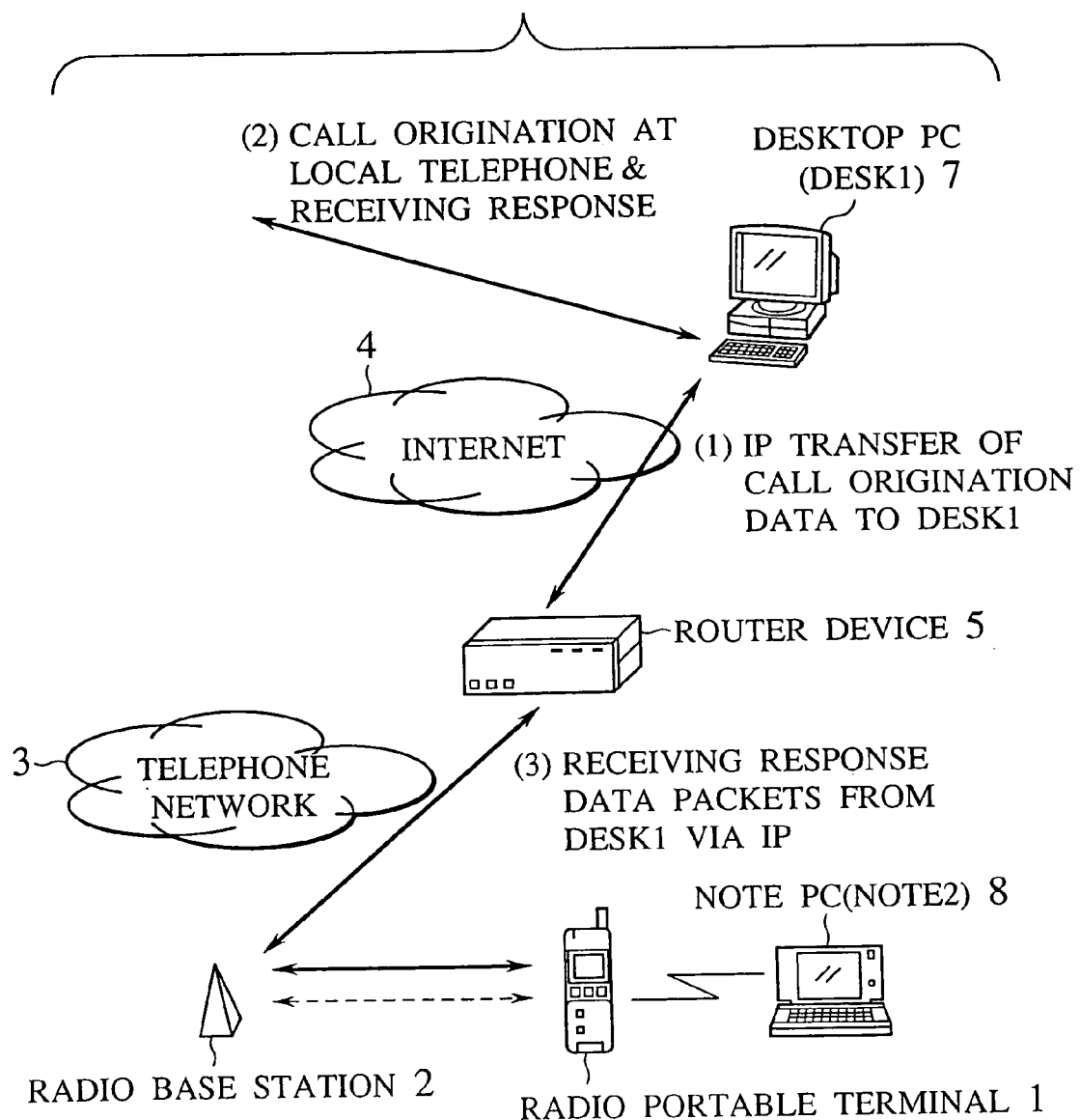
FIG. 17 is a diagram for explaining another exemplary operation sequence with respect to transmission data packets in the radio portable terminal device of FIG. 3.

It is also possible to use the control according to the rule 4 described above. Namely, as shown in FIG. 17, in the case of trying to receive an information service by dialing an area code (assumed to be 408 here for example) through the Internet telephone, if the fixed rate of the local telephone is available from the desktop PC 7 and there is no urgent need for acquiring information, then the call origination to the telephone number under the area code 408 is not carried out from the radio portable terminal 1, and only the necessary dialing data are transferred to the desktop PC 7 via the Internet 4 and data of the information service are received at the desktop PC 7 side. Then, the data received by the desktop PC 7 are transferred via the Internet 4, the router device 5, and the radio base station 2 to the radio portable terminal 1, and the D/A conversion and the formatting are applied there. In this way, it is possible to receive the desired voice telephone service at lower cost.

Next, the data attributes to be used at a time of referring to the transfer data attribute table 672 will be described.

In order to realize the control for changing the processing of the received information according to the information (router) described in the transfer data attribute table 672 at the radio portable terminal 1 of this embodiment, that is, such a control that the attached data in the voice session using voice data with the attached data attached thereto are transferred to the node PC 8 that is connected by IrDA or the like while reproducing the voice information at the own device, for example, it is presupposed that a data attribute tag for identifying a type of information contained in a packet is attached to each packet that is received via the Internet 4. There are various methods for realizing this, and the well known mark-up language such as HTML or XML can be used for this purpose, for example.

However, it is not necessarily true that the data attribute tags are attached to all the information on the Internet 4 in a unified fashion using such a mark-up language. For example, there can be some Web sites using the mark-up language that cannot be used on the radio portable terminal 1 because of the limitation on resources. Also, as in a configuration shown in FIG. 17, in the case where the voice session is to be set up via the Internet 4 and the (local) telephone network 3, the voice telephone data that pass through the (local) telephone network 3 in forms of analog signals may not necessarily be attached with the data attribute tag.

For this reason, the desktop PC 7 that carries out communications with the radio portable terminal 1 via the Internet 4 can be controlled to function as follows such that it becomes possible for the radio portable terminal 1 to process even those information to which the data attribute tags are not attached or those information to which the data attribute tags that are incomprehensible to the radio portable terminal 1 are attached.

Namely, in the configuration shown in FIG. 17, the desktop PC 7 make a call origination with respect to the telephone number specified from the radio portable terminal 1, and upon obtaining the desired analog voice information, converts the analog voice data into digital signals and converts the digital signals into packets. At this point, the desktop PC 7 attaches a data attribute tag indicating the voice data to the obtained information at the same time. Packets with that data attribute tag attached thereto are then transferred to the radio portable terminal 1 via the Internet 4, the router device 5 and the radio base station 2. At the radio portable terminal 1, the transfer data attribute table 672 is referred using a value of the data attribute tag attached to these packets, and whether to present this message to the user at the own device or to transfer it to the note PC 8 is determined. This scheme is applicable not only to the stored voice data such as those of the information service, but also to the real time voice, that is, the case of utilizing the ordinary telephone service at the note PC 8 via the radio portable terminal 1.

Also, in the case where a fee required for accessing the Internet 4 from the desktop PC 7 is cheaper than a fee required for accessing the Internet 4 from the radio portable terminal 1, it is possible for the user to enjoy some merit regarding the fee, by providing the user with the following function in the configuration shown in FIG. 17.

Namely, it is possible to provide a function by which the desktop PC 7 collects information of the Web page group that is suddenly become necessary for the user at a visited site, on behalf of the user for whom the utilization fee is high. The user commands the necessary Web page group to the desktop PC 7 via the Internet 4, using either the note PC 8 or the radio portable terminal 1. The desktop PC 7 accesses these Web pages sequentially according to the given command, and returns the collected information collectively via the Internet 4 to the radio portable terminal 1 or the note PC 8. At this point, if the specified Web page is one that uses the data attribute tag that is not supported by the radio portable terminal 1, the desktop PC 7 may convert the data attribute tag into one that is supported by the radio portable terminal 1.

Now, in the above, the final transfer destination of packets received (whether or not to transfer them to the related PC) is determined according to the data attribute tag attached thereto, but it is also possible to determine the final transfer destination even for a packet flow to which the data attribute tag is not attached by using the following method. This method can reduce the communication fee that the user have to pay in the case where the flow rate charging is adopted in the Internet 4 to which the radio portable terminal 1 is connected while the flat rate charging is adopted in the telephone network 3 to which the desktop PC 7 is connected.

In the configuration shown in FIG. 17, in the case of carrying out voice communications using the radio portable terminal 1 or the note PC 8, it is controlled such that communications are carried out via the telephone network 3 to which the desktop PC 7 is connected if the prescribed condition is satisfied, that is, if the charging system is as described above, for example. In this case, the radio portable terminal 1 or the note PC 8 first sets up a voice communication channel, such as a voice session according to RTP for example, towards the desktop PC 7 via the radio base station 2, the router device 5 and the Internet 4. Then, the radio portable terminal 1 or the note PC 8 controls the desktop PC 7 via the radio base station2, the router device 5 and the Internet 4, to set up a voice connection on the telephone network 3 to the correspondent of the voice communication.

Then, the desktop PC 7 relays the information that flows in from the voice communication channel between the desktop PC 7 and the radio portable terminal 1 or the note PC 8 onto the voice connection on the telephone network 3, and the information that flows in from the voice connection on the telephone network 3 onto the voice communication channel between the desktop PC 7 and the radio portable terminal 1 or the note PC 8. At this point, at the radio portable terminal 1, each received packet can be identified as a packet received from the voice communication channel set up between the desktop PC 7 and the own device by referring to the port number of each received packet, and it can be conjectured that the voice information is transferred by that packet. The radio portable terminal 1 processes the packet received from the voice communication channel according to this conjecture, according to the contents of the rules that specify the final transfer destination of the voice information (whether or not to transfer it to the related PC) in the transfer data attribute table 672.

Next, in this embodiment, it becomes possible for the user of the radio portable terminal 1 to receive the call termination of the voice communication via the desktop PC 7 by using the following method. Using this method, it is possible to reduce the utilization fee that the correspondent have to pay in the case where the fee of the radio communication network is higher than the fee of the voice network connected to the desktop PC 7 and the receiving the call termination from the correspondent who carries out the communication toward the user of the radio portable terminal 1.

In the configuration shown in FIG. 17, if there is a call termination from the telephone network 3 to which the desktop PC 7 is connected, the desktop PC 7 responds to this call termination, and makes the set up of the own device in order to carry out communications using the voice connection via the telephone network 3. In addition, the desktop PC 7 sets up a first voice channel, such as a voice session according to RTP for example, that reaches to the radio portable terminal 1 via the Internet 4, the router device 5 and the radio base station 2.

Upon receiving the voice channel set up, the radio portable terminal 1 refers to the transfer data attribute table 672 so as to ascertain whether the final transfer destination of the voice information (whether or not to transfer it to the related PC) is the radio portable terminal1 or the note PC 8. If it is the note PC 8, the radio portable terminal 1 sets up a second voice channel between the own device and the note PC 8.

Then, the desktop PC 7 carries out the information transfer between the above described voice connection and the first voice channel, while the radio portable terminal 1 carries out the information transfer between the first voice channel and the second voice channel if the second voice channel was set up. At this point, at the radio portable terminal 1, whether the received packet is a packet belonging to the first voice channel or not can be ascertained by referring to the port number of the received packet, and it can be conjectured that all packets belonging to the first voice channel are transferring the voice information, so that it becomes possible to carry out the voice information processing according to a method specified by the transfer data attribute table 672. Namely, in this case, if there is no need to attach the data attribute tag to the packets on the first voice channel and the Internet adopts the flow rate charging, it is also possible to reduce the utilization fee that the user of the radio portable terminal 1 have to pay.

Now, in the case of utilizing the Internet service or the like that handles the Internet telephone and the multimedia data by using the radio portable terminal conventionally, if a radio portable telephone is used as the terminal, there have been limitations regarding resources that can be mounted on the terminal such as a display resolution for the image data and a memory device for storing data. In this regard, the desktop PC provided at a home or the like and the portable note PC have advantages that resources are richer, that handling of applications is better, that a communication cost is lower, etc.

In view of this fact, in this embodiment, the radio portable terminal is used in cooperation with the desktop PC provided at a home or the like and the portable note PC, and the manner of cooperation is controlled according to the data attribute or the processing inside the radio portable terminal is controlled according to the data attribute.

In this way, in the case where the received image data require a high resolution display device or in the case where there is no need to view the content of the image data for a time being while the user is moving, it is possible to realize the control such that the image data are stored into a memory on the radio portable terminal side, or the image data are not displayed on the radio portable terminal side and transferred via the Internet to the desktop PC, or the image data are transferred via a local network using radio/infrared to the note PC that is carried around at the same time.

It is also possible to make the user interface of the radio portable terminal more user-friendly in such a manner that the URL data stored in the note PC carried around by the user can be uploaded into the radio portable terminal and the radio portable terminal can be operated by caching that URL into an address register of the Web browser of the radio portable terminal, for example.

Also, in the case where the correspondent of the Internet telephone can be called up by the local telephone from a location of the desktop PC, it is possible to realize the control such that data are transferred to the desktop PC provided at a home or the like via the Internet once and then the call origination is made from there, so as to reduce the communication fee.

Note that the above description has been directed to the exemplary case of making the voice output at the radio portable terminal 1 while transferring the attached data to the related PC in the case of the voice data with the attached data attached thereto, but it is also possible to realize the control such that the attached data are displayed at the radio portable terminal 1 while the voice data (or the voice data and the attached data) are transferred to the related PC in the case where the voice data have a very large size (such as several pieces of music that require a considerable playing time, for example) while the attached data are character data in a small data size (such as a list of titles of the music, for example).

Also, the radio portable terminal 1 may be provided with only one of the function for utilizing the Internet telephone gateway and the function for processing within the own device.

Also, only one of a computer such as the desktop PC provided at a home and a mobile computer such as the note PC that is carried around by the user along with the radio portable terminal 1 may be made utilizable by the radio portable terminal 1.

Also, the radio portable terminal 1 is not limited to one having an outer appearance of the so called portable telephone, and may have any desired outer appearance.

Also, in the case of cooperating the radio portable terminal 1 and the desktop PC or the note PC, the difference between the radio portable terminal 1 and the desktop PC or the note PC is relative so that the note PC having a radio function may functions as the radio portable terminal 1 in some cases.

It is also to be noted that the above described embodiments according to the present invention may be conveniently implemented using a conventional general purpose digital computer programmed according to the teachings of the present specification, as will be apparent to those skilled in the computer art. Appropriate software coding can readily be prepared by skilled programmers based on the teachings of the present disclosure, as will be apparent to those skilled in the software art.

In particular, each of the radio portable terminal device and the gateway device of the above described embodiment can be conveniently implemented in a form of a software package.

Such a software package can be a computer program product which employs a storage medium including stored computer code which is used to program a computer to perform the disclosed function and process of the present invention. The storage medium may include, but is not limited to, any type of conventional floppy disks, optical disks, CD-ROMs, magneto-optical disks, ROMs, RAMs, EPROMs, EEPROMs, magnetic or optical cards, or any other suitable media for storing electronic instructions.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A radio terminal device, comprising:
    a radio communication unit configured to carry out communications via a computer network or a telephone network through a radio base station by exchanging data packets;
    a local network communication unit configured to carry out communications with another computer/device connected to a local network different from the computer network or the telephone network, the local network being a network locally defined for communications between the radio terminal device and said another computer/device; and
    a packet transfer processing unit configured to determine whether a specific processing of the data packets received from a correspondent device connected to the computer network or the telephone network by the radio communication unit is to be carried out using resources of the radio terminal device or not, according to an attribute of the data packets or data contained in the data packets, and transferring a part or whole of the data contained in the data packets to at least one of said another computer/device from the local network communication unit and another computer connected to the computer network from the radio communication unit such that the specific processing of the data packets determined not to be carried out using the resources of the radio terminal device is carried out at said at least one of said another computer/device and said another computer.

2. The radio terminal device of claim 1, wherein said another computer/device is located in a vicinity of the radio terminal device and the local network communication unit is connected to said another computer/device using a radio or infrared connection.

3. The radio terminal device of claim 1, wherein the data packets received from the correspondent device by the radio communication unit contain multimedia data, and the packet transfer processing unit outputs one type of data in a specific medium among the multimedia data through an output device associated with the radio terminal device while transferring other type of data in media other than the specific medium among the multimedia data to said another computer/device or said another computer.

4. The radio terminal device of claim 1, further comprising a memory configured to register in advance a rule information given in terms of at least one of size, format, and content of data, which is to be used as criteria for a determination to be made by the packet transfer processing unit.

5. The radio terminal device of claim 1, wherein the packet transfer processing unit determines to transfer one type of data contained in the data packets that have a specific type of attribute to said another computer/device or said another computer without outputting or storing said one type of data at the radio terminal device.

6. The radio terminal device of claim 1, wherein the packet transfer processing unit determines to transfer one type of data contained in the data packets that have a size exceeding a capacity of a memory medium available in the radio terminal device to said another computer/device or said another computer without storing said one type of data at the radio terminal device.

7. The radio terminal device of claim 1, wherein the packet transfer processing unit determines to output one type of data contained in the data packets that have a specific type of attribute through an output device associated with the radio terminal device without storing said one type of data at the radio terminal device and without transferring said one type of data to said another computer/device or said another computer.

8. The radio terminal device of claim 1, wherein the data contained in the data packets are voice data and image data associated with the voice data and at least a part of the image data have a prescribed tag information attached thereto, and the packet transfer processing unit outputs the voice data and the image data in synchronization according to the prescribed tag information, through output devices associated with the radio terminal device.

9. The radio terminal device of claim 1, further comprising a memory configured to register in advance priority levels assigned to a plurality of computers/devices, and the packet transfer processing unit selects one of said plurality of computers/devices as said another computer/device or said another computer according to the priority levels registered in the memory.

10. The radio terminal device of claim 1, wherein the radio communication unit receives the data packets from the correspondent device via said another computer, in a converted form by which an attribute of data contained in the data packets can be identified or conjectured at the radio terminal device that is obtained at said another computer.

11. The radio terminal device of claim 1, wherein the radio communication unit has at least one of a function for connecting the radio terminal device to the telephone network via the radio base station and a function for connecting the radio terminal device to the computer network via the radio base station and a router device.

12. The radio terminal device of claim 1, wherein the packet transfer processing unit determines to output the data contained in the data packets at the radio terminal device, store the data at the radio terminal device, transfer the data to said another computer/device, or transfer the data to said another computer, by referring to a data attribute tag attached to the data and indicating a type of the data.

13. A communication processing control method at a radio terminal device, comprising:

connecting the radio terminal device with a correspondent device connected to a computer network or a telephone network, through a radio base station, and receiving data packets from the correspondent device;

connecting the radio terminal device with another computer/device connected to a local network different from the computer network or the telephone network, the local network being a network locally defined for communications between the radio terminal device and said another computer/device;

determining at the radio terminal whether a specific processing of the data packets received from the correspondent device is to be carried out using resources of the radio terminal device or not, according to an attribute of the data packets or data contained in the data packets; and transferring a part or whole of the data contained in the data packets from the radio terminal device to said another computer/device or another computer connected to the computer network, such that the specific processing of the data packets is carried out at said another computer/device or said another computer when the determining step determines that the specific processing of the data packets is not to be carried out using the resources of the radio terminal device.

* * * * *